Sept. 25, 1956 E. P. G. WRIGHT ET AL 2,764,750

ARRANGEMENTS FOR EXTRACTING INFORMATION FROM ELECTRICAL STORAGE CIRCUITS

Filed Nov. 30, 1950 19 Sheets-Sheet 1

Inventors
ESMOND P. G. WRIGHT
JOSEPH RICE

By Robert Harding Jr.
Attorney

Inventor
E. P. G. WRIGHT-
J. RICE
By Robert Harding Jr.
Attorney

Inventors
ESMOND P. G. WRIGHT
JOSEPH RICE
By Robert Harding Jr
Attorney

Inventor
E.P.G. WRIGHT-
J. RICE
By Robert Harding Jr.
Attorney

Inventor
E. P. G. WRIGHT-
J. RIGE
By Robert Harding Jr
Attorney

Inventor
E.P.G. WRIGHT-
J. RICE
By [signature]
Attorney

Sept. 25, 1956 E. P. G. WRIGHT ET AL 2,764,750

ARRANGEMENTS FOR EXTRACTING INFORMATION FROM ELECTRICAL STORAGE CIRCUITS

Filed Nov. 30, 1950 19 Sheets-Sheet 7

Inventor
E. P. G. WRIGHT-
J. RICE
By [signature]
Attorney

Sept. 25, 1956 E. P. G. WRIGHT ET AL 2,764,750

ARRANGEMENTS FOR EXTRACTING INFORMATION FROM ELECTRICAL STORAGE CIRCUITS

Filed Nov. 30, 1950 19 Sheets-Sheet 8

Inventors
ESMOND P. G. WRIGHT
JOSEPH RICE
By [signature]
Attorney

Inventor
E. P. G. WRIGHT-
J. RICE
By [signature]
Attorney

Inventor
E. P. G. WRIGHT-
J. RICE
By [signature]
Attorney

Inventor
E.P.G. WRIGHT-
J. RICE
By Robert Harding Jr.
Attorney

Inventors
ESMOND P. G. WRIGHT
JOSEPH RICE
By Robert Harding Jr.
Attorney

Sept. 25, 1956 E. P. G. WRIGHT ET AL 2,764,750
ARRANGEMENTS FOR EXTRACTING INFORMATION
FROM ELECTRICAL STORAGE CIRCUITS
Filed Nov. 30, 1950 19 Sheets-Sheet 13

Inventor
E. P. G. WRIGHT
J. RICE
By Robert Harding Jr.
Attorney.

Inventor
E. P. G. WRIGHT-
J. RICE
By Robert Harding Jr.
Attorney

Inventor
E. P. G. WRIGHT-
J. RICE
By Robert Harding Jr.
Attorney

Sept. 25, 1956 E. P. G. WRIGHT ET AL 2,764,750

ARRANGEMENTS FOR EXTRACTING INFORMATION FROM ELECTRICAL STORAGE CIRCUITS

Filed Nov. 30, 1950 19 Sheets-Sheet 16

Inventor

E. P. G. WRIGHT-

J. RIGE

By [signature]

Attorney

Sept. 25, 1956 E. P. G. WRIGHT ET AL 2,764,750

ARRANGEMENTS FOR EXTRACTING INFORMATION FROM ELECTRICAL STORAGE CIRCUITS

Filed Nov. 30, 1950 19 Sheets-Sheet 17

Inventor
E. P. G. WRIGHT-
J. RICE
By Robert Harding Jr.
Attorney.

Inventor
E. P. G. WRIGHT-
J. RICE
By Robert Harding Jr.
Attorney

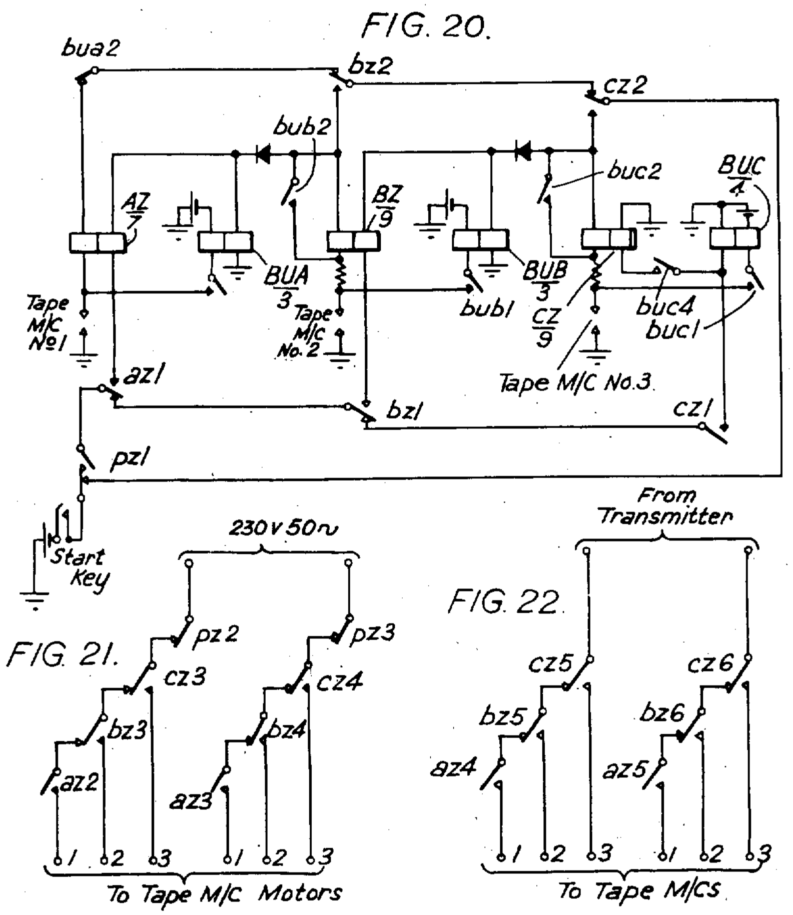
FIG. 20. FIG. 21. FIG. 22.
FIG. 23
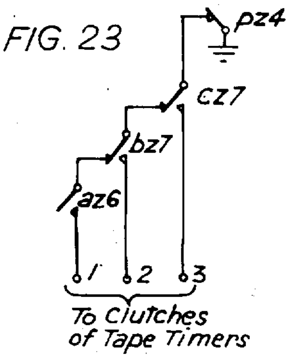
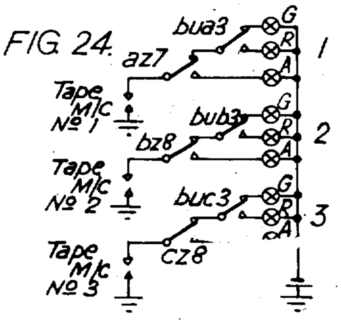
Inventor
E. P. G. WRIGHT-
J. RICE
By Robert Harding Jr.
Attorney United States Patent Office 2,764,750

Patented Sept. 25, 1956

2,764,750

ARRANGEMENTS FOR EXTRACTING INFORMATION FROM ELECTRICAL STORAGE CIRCUITS

Esmond Philip Goodwin Wright and Joseph Rice, London, England, assignors, by mesne assignments, to International Standard Electric Corporation, New York, N. Y., a corporation of Delaware Application November 30, 1950, Serial No. 198,327

Claims priority, application Great Britain December 2, 1949

5 Claims. (Cl. 340—174)

This invention relates to electrical equipment for the recording of information.

When information has to be recorded, and such recording has to be carried through in a definite fashion, it is possible to precede the information with instructions relating to the manner of recording to be followed.

The invention provides electrical equipment for the recording of information comprising receiving means for instructions relating to the manner of recording of information and means, under the control of said receiving means, for recording a plurality of separate items of information each in the same manner following the receipt of a single instruction relating to all said items of information.

The invention also provides electrical equipment for the recording of information comprising receiving means for instructions relating to the manner of recording of information, and means for determining from the receipt of a single instruction whether each of a plurality of following items of information is to be preceded by an instruction individual thereto or whether a plurality of following items of information is to be preceded by a multiple instruction relating to all of said plurality.

The invention also provides electrical equipment for the recording of information comprising a control circuit operable to set out in the same predetermined manner recordings of different items of information.

The invention will now be described with reference to one embodiment thereof shown in the accompanying drawings, in which.

Figure 15:
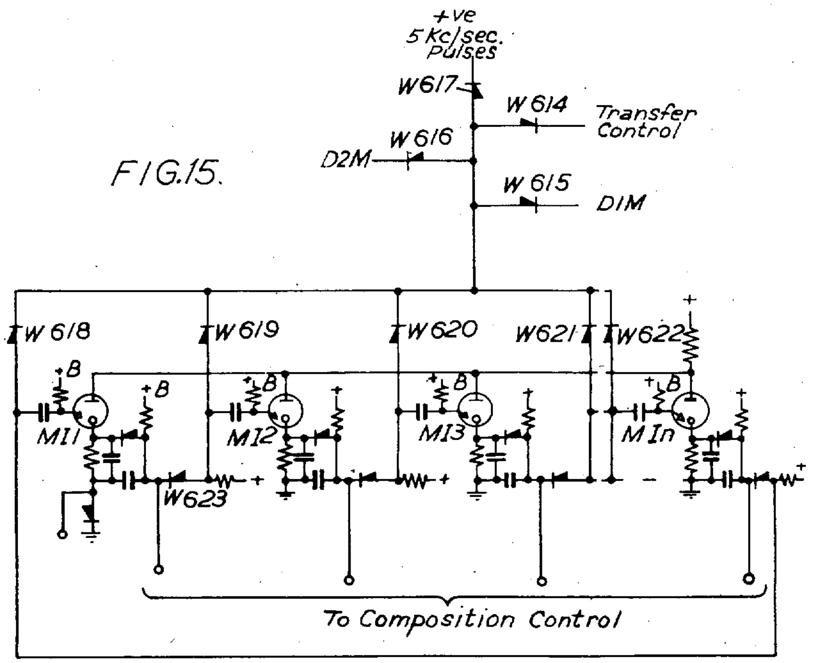
Figure 13A:
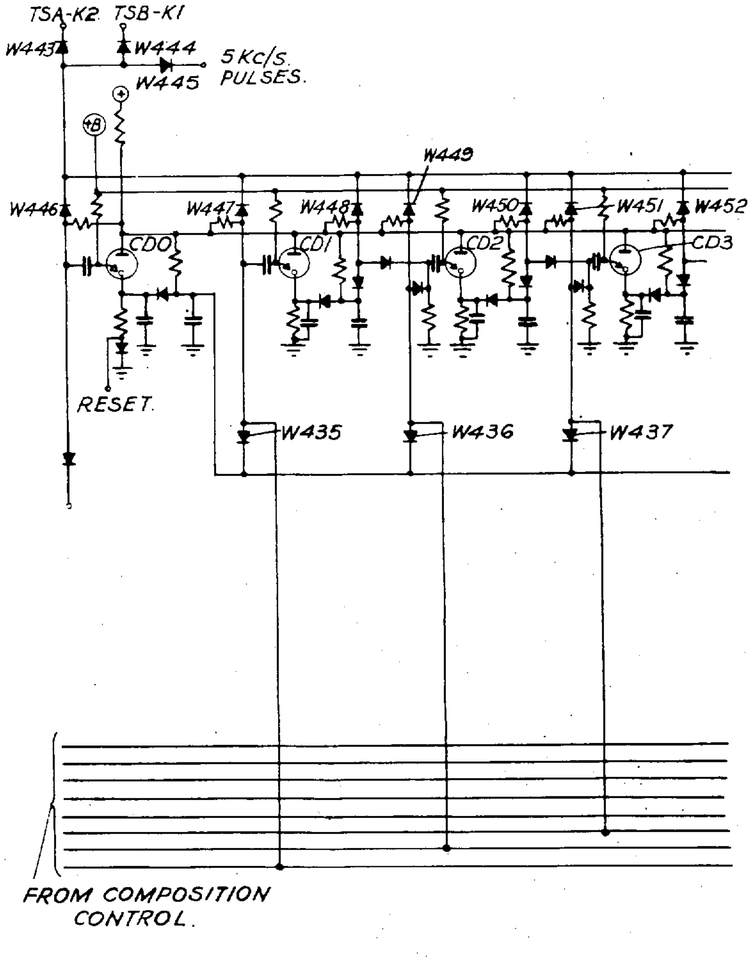
Figure 13B:
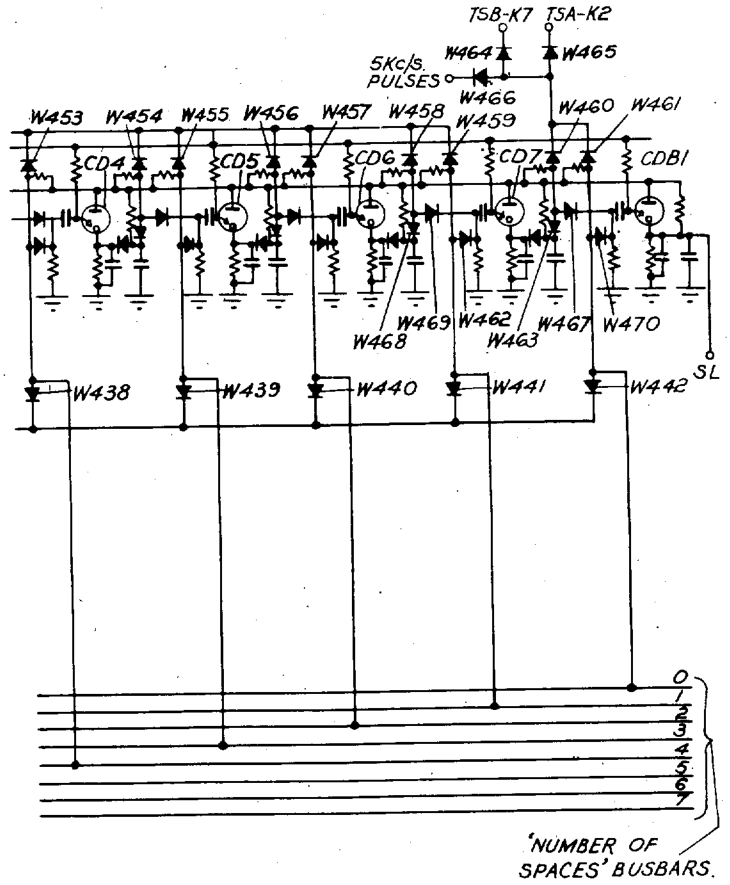
Figure 14:
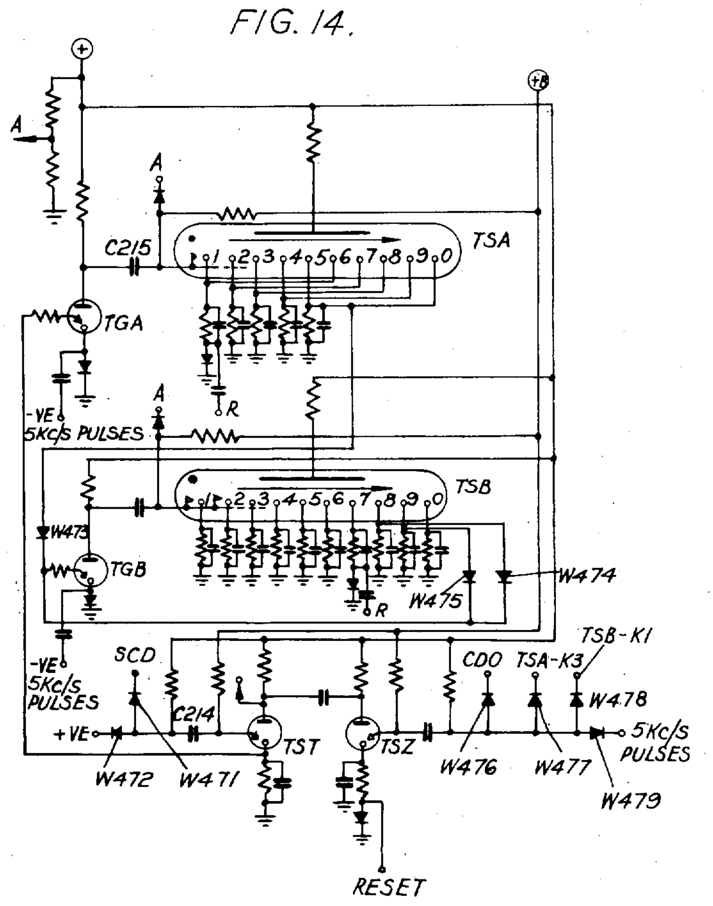
Figure 16:
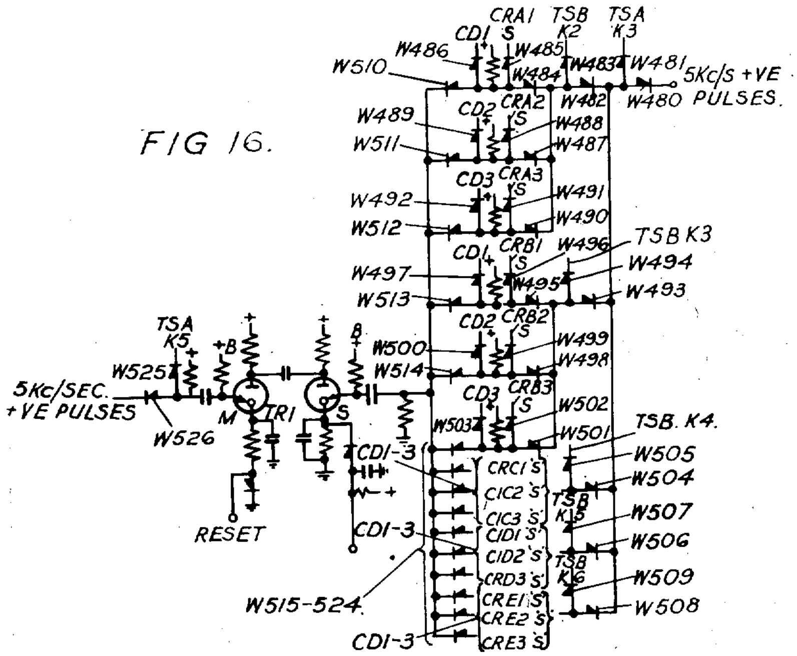
Figure 17:
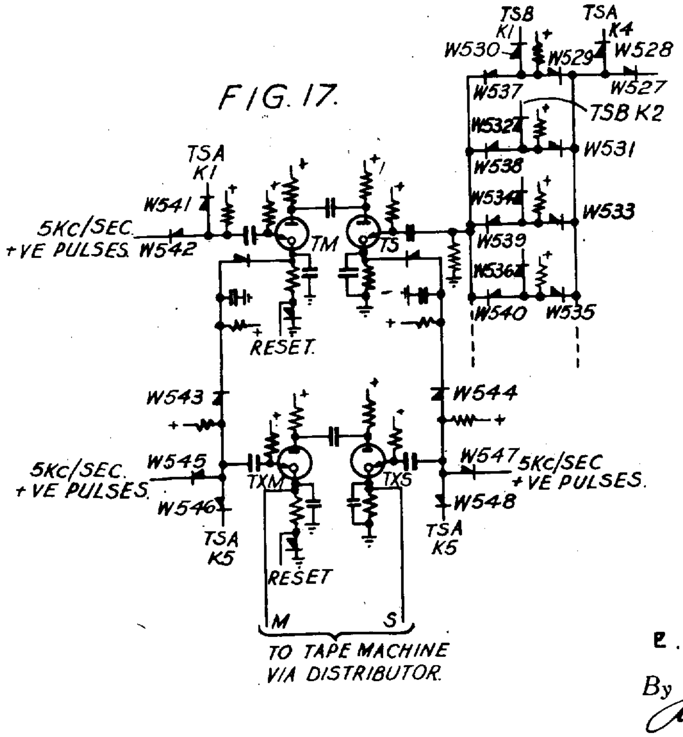
Figure 18:
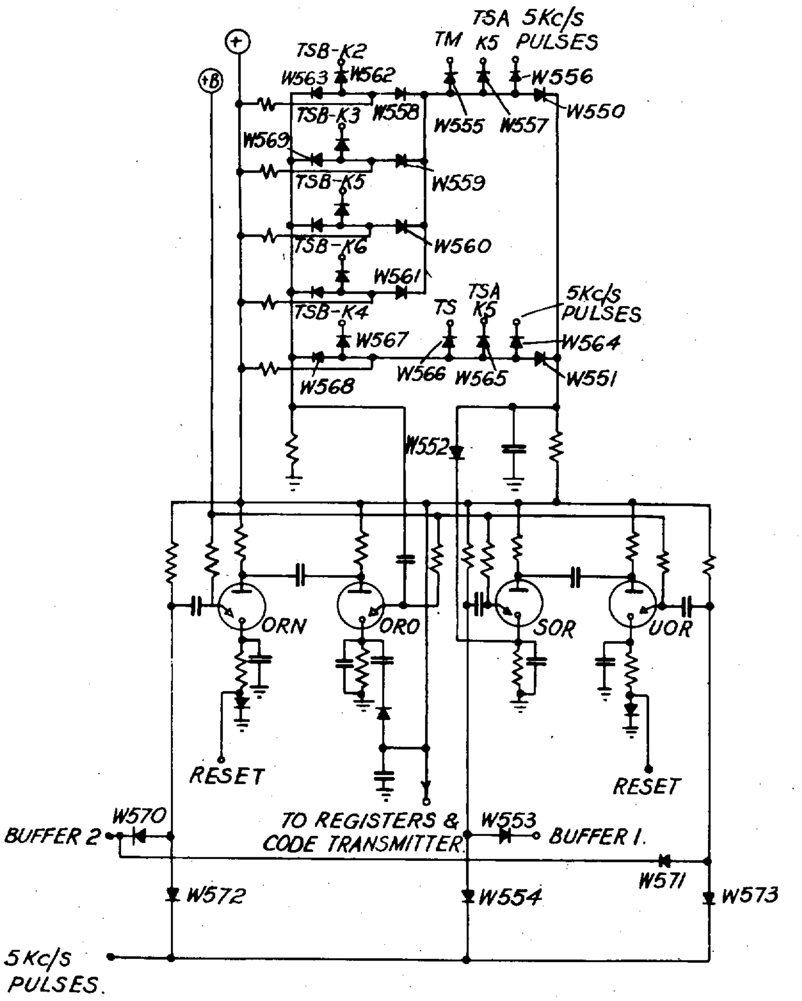
Figure 19:
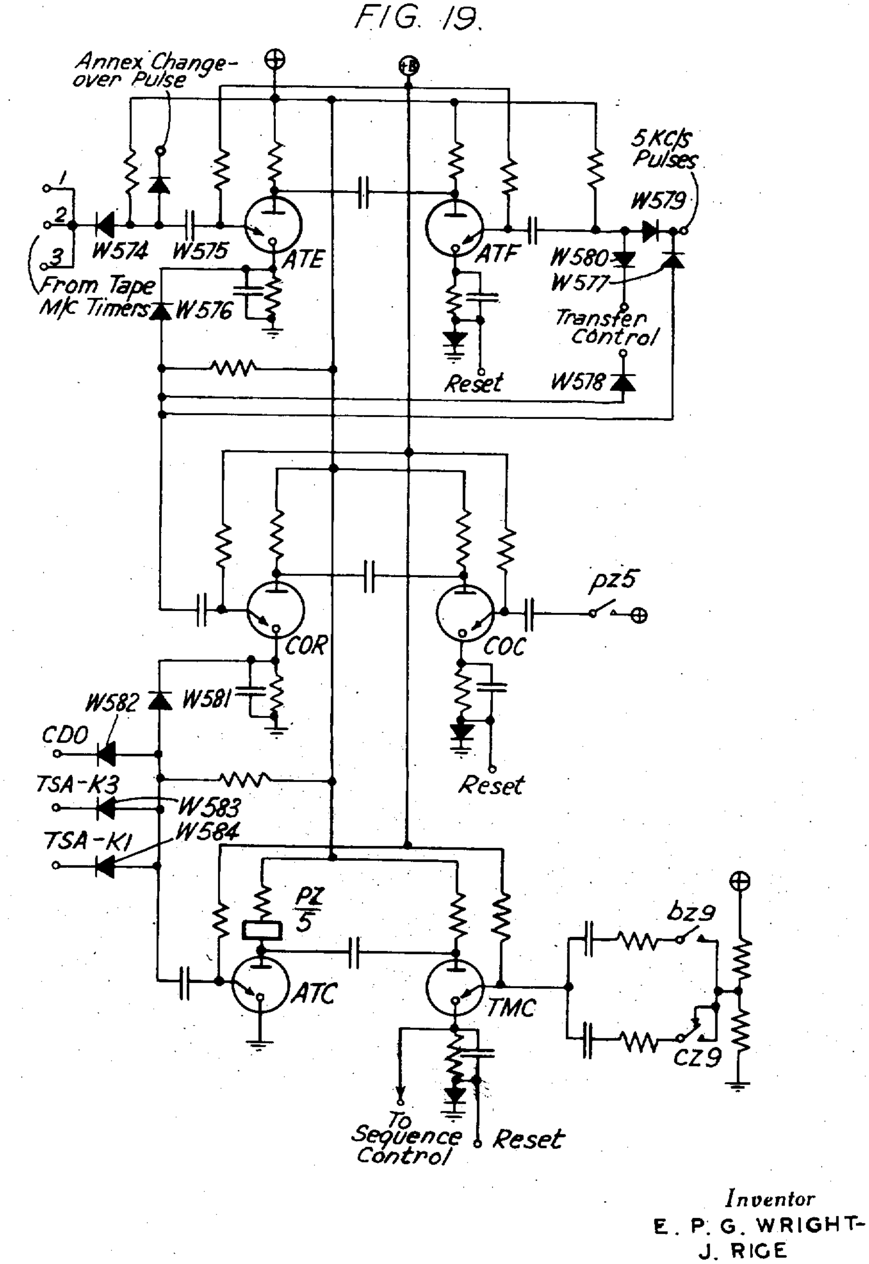

Fig. 13A and 13B together are a circuit diagram of the composition distributor which controls the actual recording (Fig. 13B is to be placed to the right of Fig. 13A);

Fig. 14 is a circuit diagram of a time scale which synchronises various operations in the reconverter and compositor;

Fig. 15 shows the circuit of a multiple instruction store which has been added to the extraction equipment of the above-mentioned copending application;

Fig. 16 shows parts of the transmitter circuit which transfers the information to be recorded from the register to the recording head of the magnetic tape machine;

Fig. 17 shows different parts of the transmitter circuit which transfers the information to be recorded from the register to the recording head of the magnetic tape machine;

Fig. 18 shows the output reader which scans the information transferred from the register and controls certain operations therein;

Fig. 19 is the discharge tube circuit portion of the tape machine distributor which controls the passage of information to an appropriate tape machine;

Fig. 20 is the relay circuit portion of the same distributor shown in Fig. 19;

Fig. 21 is the relay contact diagram relating to the supply of power to the various tape machine motors;

Fig. 22 shows the relay contact arrangement over which information is transferred to the tape machine in use;

Fig. 23 shows the relay circuit for energizing the timing mechanisms of the different tape machines in turn;

Fig. 24 shows the "ready state" indication system for the tape machines.

Although the embodiment of the invention which has been described includes conversion between different code forms, the invention is not limited to systems in which such conversion is required.

GENERAL DESCRIPTION

Figure 1:
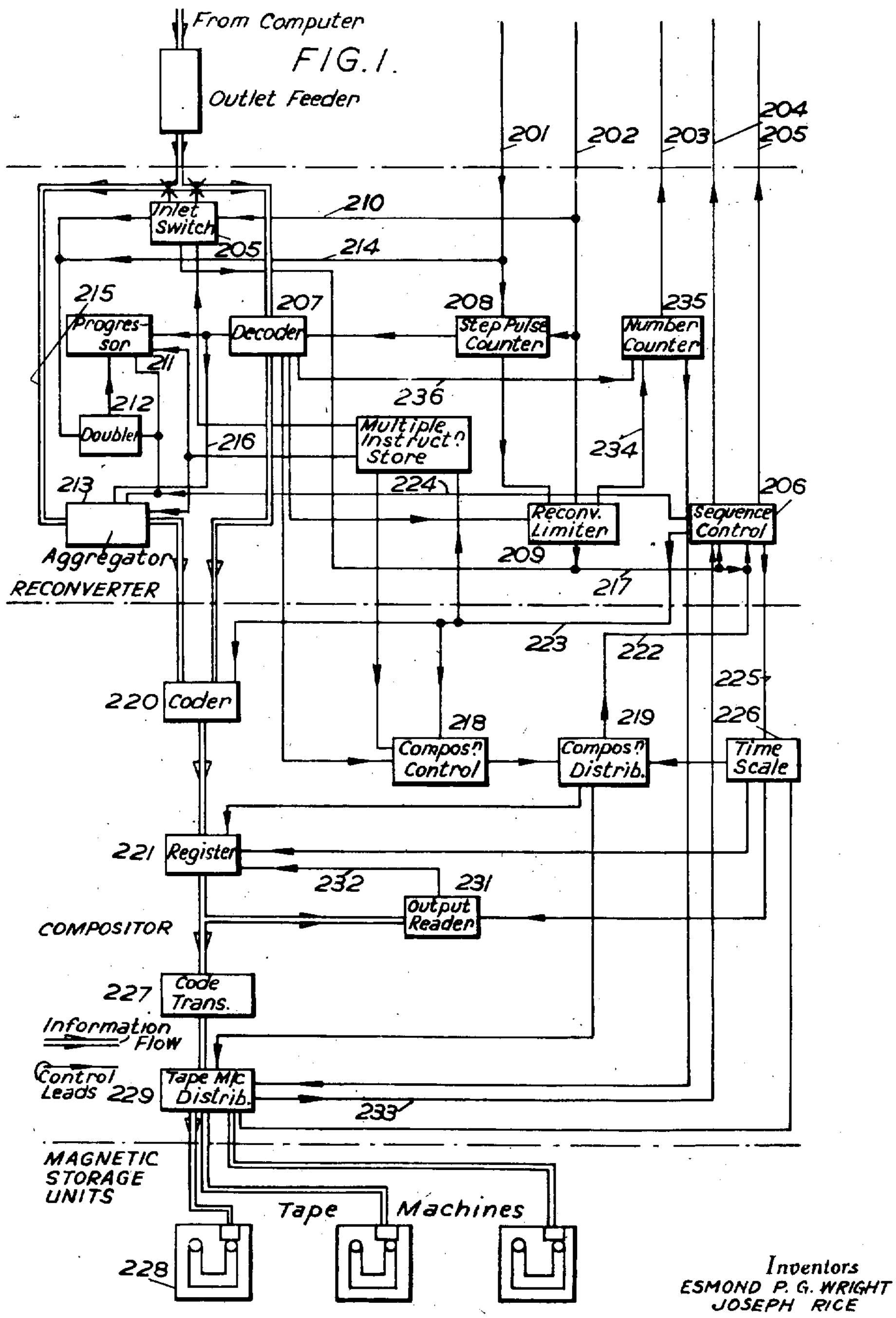
Fig. 1 shows the schematic circuit diagram of an electrical computer result extraction equipment similar to that described in copending application Ser. No. 198,326, filed November 30, 1950, but modified so that a single instruction or group of instructions preceding a number of individual results may control the manner of recording them all.

The arrangement shown in Fig. 1 includes two main items of equipment. These are the reconverter and the compositor each of these comprises a number of circuits all of which can be considered individually and the block schematic of Fig. 1 shows their arrangement. It will be remembered that information from the calculator is fed via one or other of its outlets to a corresponding pair of output annex tubes. From there the information is passed to an outlet feeder capable of storing one long number, that is, 36 binary elements. The outlet feeder is indicated at, the top left hand side of Fig. 1. Besides this one connection to the calculator proper there is another lead over which step pulses are fed from the calculator to the reconverter. This lead is shown at 201. Four control leads, 202–205 pass from the reconverter and the compositor to the calculator. The purpose of these leads will become clear in the following general description.

The information emitted from the calculator is in the form of binary elements, the presence or absence of a pulse at any time position denoting respectively the presence or absence of an element, as has already been stated the information passed is in the form of first a composition instruction and then numerical data, these two kinds of information alternating. The composition instruction and the numerical data each take a time represented by 36 binary element positions. The composition instruction is related to the number which follows and it is, therefore, necessary to register the information which it contains for subsequent use. Thus, a distributor is required to route the information from the outlet feeder to the appropriate section of the reconverter. Step pulses fed over lead 201 from the calculator control the operation of the distributor. This, the distributor, is schematically shown as an inlet switch 205.

A general outline of a typical operation will now be followed through and it will be assumed that a composition instruction is already contained within the outlet feeder. With the reconverter in its rest condition, the sequence control 206 sends a signal over lead 205 to indicate to the calculator that the reconverter is ready to receive information. Also in the rest condition the inlet switch is arranged to pass information from the outlet feed to the decoder 207.

The step pulse is sent from the calculator and the step pulse counter 208 in the reconverter records one pulse received. Concurrently with the step pulse the first instruction pulse is passed from the outlet feeder to the decoder 207. Further step and information pulses are received until at the 36th step pulse the step pulse counter 208 is returned to its rest condition. When the step pulse counter returns to its rest position a signal is sent to the reconversion limiter 209 and this transmits over lead 202 a number end pulse to the calculator. Receipt of the number end pulse at the calculator informs the latter that the contents of the outlet feeder have been registered and the next set of information can be transmitted. Over lead 210 a pulse is sent from the reconversion limiter to the inlet switch, changing this over so that the next item of information will be passed to the arithmetic unit comprising the progressor 211, the doubler 212 and the aggregator 213. The calculator on receipt of the number end pulse passes the numerical data to the outlet feeder. Another step pulse is sent and over lead 214 this pulse starts the operation of the doubler 212. Information pulses are fed from the outlet feeder via lead 215 to the aggregator. Further step and information pulses are received and the information pulses all pass to the arithmetic unit. The full operation of this unit has been described in copending application, Serial No. 197,206, filed November 24, 1950. The unit produces the decimal or sterling equivalent of the binary information received. One element in the composition instruction is used to show that the number which follows is either decimal or sterling. In accordance with the appropriate section of the decoder 207 controls, over the lead 216, the operation of the progressor and aggregator so that the correct conversion process occurs.

It has already been stated that the outlet feeder has a capacity of 36 binary elements, but only 35 of these are used for passing information to the reconverter. In spite of this, many items of numerical data passed from the calculator will not even require 35 binary elements. In order to save time, therefore, the reconversion process is stopped when it is known that there are no further significant elements. For instance, if it is known that particular printed results will only require one decimal digit only the four least significant binary digits are needed to pass this result. The arithmetic unit requires one other binary element for a reason made clear elsewhere, so that in all only five binary element positions are required for a one decimal digit number to be printed. The composition instruction which precedes the numerical data contains information as to the number of element positions occupied by the number. The step pulse counter counts the number of elements received by the reconverter so that the reconversion process may be easily brought to a halt. The reconversion limiter 209 accomplishes this. It responds to the correct number of elements being received and transmits a number end pulse over lead 202. The number end pulse stops further information being fed and also changes over the inlet switch 205.

At this stage the composition instruction is registered on the decoder 207 and the numerical result is registered by the aggregator 213. In order to free these units immediately for further use the information is re-registered in the compositor. During the re-registering the sequence control 206, under control of the reconversion limiter over lead 217, passes the reconverter un-ready signal to the calculator over lead 204.

The circuits of the compositor which are concerned with the receipt of information from the reconverter are the composition control 218, the composition distributor 219, the coder 220 and the register 221. The sequence control 206 takes charge of the passing of the information from the reconverter to the compositor. With the composition distributor in its rest position indicated to the sequence control over lead 222, the pulse from the reconversion limiter over lead 217 causes the sequence control to be set to the transfer operating position. In this position the transfer signal is sent over lead 223 to allow the transfer of the contents of the decoder and aggregator to pass to the compositor. In the decoder there are both tabulation information and particulars regarding the number, e. g. the position of the integer point. This intelligence passes to the composition control 218, other intelligence in the decoder may need to be recorded and this, therefore, is passed to the coder 220 and to the register 221. The numerical information from the aggregator is passed via the coder to the register. The composition control 218 ensures that the composition distributor 219 is set up in accordance with the particular requirements of the information to be recorded. The coder 220 is a translation network used to translate the information to be recorded into a particular code which is used for the recording. When this operation is completed the sequence control sends a restore signal over leads 224, re-setting the arithmetic unit to its rest position ready for it is to be used again. The sequence control now restores to its normal rest position and the reconverter ready signal is sent over lead 205 to the calculator allowing the next items of information to be passed via the outlet feeder to the reconverter.

The compositor is now ready to proceed with the recording of the information stored in the register. At the same time as the sequence control sent the restore signal to the arithmetic unit a signal was also sent from the sequence control over lead 225 to start a time scale 226. The time scale provides a time basis for an 8-unit code; one unit period is used for the start element, five for the character intelligence and 2 for the stop elements. The time scale in co-operation with the composition distributor controls the passage of the information from the register to the code transmitter 227 in the particular temporal relationship which is required. The code transmitter 227 receives the elements in turn and causes a record to be made on the magnetic tape in the associated magnetic storage unit, a tape machine such as 228.

One tape machine such as 228 may not be sufficient to hold all the information passed in one reconversion operation. Hence, a number of tape machines are provided (three as shown in the figure) and the information is passed to these in turn under control of the tape machine distributor 229. The machines have practically indentical capacity for recording information so that the change over from one machine to another may be effected on a time basis. For this purpose tape timing mechanisms are incorporated in the tape machines themselves for controlling the tape machine distributor. The tape timer of the first machine is started as soon as the first tape machine is taken into use. The arrangement is such that when the allotted time is finished the recording is allowed to proceed until the contents of the output annex tube in use at that ime have all been recorded after which the tape machine distributor switches over to the next machine and a new timing sequence is begun.

For recording results in printed form it is undersirable to print a number of zeros before the significant digits. It would be better for these to be replaced by spaces. This is achieved by transferring all zeros which are recorded in the register 221 as spaces to the code transmitter. All information passed between the register and transmitter is scanned by the output reader 231. When this reader first detects a character other than a space a signal is returned to the register over lead 232, and all further space signals in the register are then replaced by zeros.

When the recording is complete the composition distributor returns to its rest position. If before this happens the next items of composition instruction and numerical data have already been passed to the reconverter, the sequence control will have returned to the calculator a reconverter un-ready signal over the lead 204. When the composition distributor reaches its rest position, the sequence control proceeds with the transfer of information from the reconverter to the compositor as previously described.

The sequence control cannot effect transfer of information from the reconverter to the compositor while the tape machine distributor is changing over. This control is exercised over lead 233.

As already stated above the outlet feeder may be fed from either one of two output annex tubes, the capacity of each of which is eight composition instructions and eight items of numerical data. The reconverter sends to the calculator a signal when it is necessary for a change-over to be effected from one annex tube to the other. Each number end pulse sent from the reconversion limiter is also taken over lead 234 to the number counter 235. This latter counter is a simple 16-way device which sends over lead 203 a signal to the calculator when 16 number end pulses have been received. This latter signal causes the outlet feeder to be fed from the other annex tube. Under some circumstances an annex tube is not filled completely. An indication is then given in the last composition instruction contained in that annex tube that that is, in fact, the last instruction. This intelligence is detected by the decoder which then controls the number counter over lead 236 to send the annex change-over signal after the following numerical data has been received.

The information recorded on the magnetic tape is subsequently transmitted to a teleprinter which prints it in a properly set-out form, including any tables that may be included.

The equipment so far described is for a system in which an individual numerical result extracted from an electrical computer is preceded by a composition instruction long number (i. e. up to 36 binary element positions in a pulse train) which gives the information necessary to convert the result from its computer form to its correct form for recording and also supplies additional information, such as tabulation data, so that a record can be made as required. In practice, there are many results for which the composition instruction is the same for a whole series of successive results, alternatively a sequence of composition instructions is repeated. An example of the latter is the recording of payroll accounts in which for each person there are records of, e. g., pay number, basic wage, tax deductions, net pay. By use of preset instructions it is possible to effect a great saving in time for it is possible to use one instruction long number provision for a whole series of results. Such an instruction in the output of the computer is then used to indicate which of the preset instructions available is required, for there are a number of these preset arrangements. For simplicity of description it will be assumed that there is a choice between two such preset instructions. In the case of a payroll recording the preset arrangement, known as a multiple instruction store, gives the necessary data for recording all the items in one person's record. It is possible repeatedly to use the multiple instruction store say throughout the recording of a complete payroll or alternatively the register may be used to deal with the items for one person after which another instruction is given, either a composition or a multiple instruction. The latter method is the one which will be described in detail for it is considered that the extra time used in this method more than compensates for the extra equipment of the alternative method. Furthermore it is preferred for its flexibility.

As stated above, there may be several multiple instruction stores and so an instruction long number, known as a multiple instruction, has to be extracted from the outlet feeder to indicate that a multiple reconversion process is to be carried out and also to indicate which particular store is required. No further instruction is required in this long number; the indications are given by use of binary element positions which are themselves used to indicate different instructions in a normal composition instruction. One early element position in the long number is used to differentiate between a composition and a multiple instruction.

In Fig. 1 there is shown one multiple instruction store, although it must be rembered that there may be several such stores.

Initially the inlet switch is set so that the outlet feeder is connected to the decoder. If the first instruction extracted to the reconverter is a normal composition instruction the operation is as described above but if there is an indication that a multiple reconversion is to follow, there is at the same time an indication which multiple instruction store is to be used, and as a result the particular store is energised. After this instruction has been received, the inlet switch changes over so that the outlet feeder is connected to the aggregator. The multiple instruction store brought into circuit controls the progressor and aggregator so that the result which follows is reconverted as required from its computer form into either a decimal or monetary e. g. sterling notation equivalent. Instead of limiting the reconversion process according to the number of significant positions in a result, as is done during the extraction of a result following an individual composition instruction the complete long number allocated to the result is received by the reconverter. It is thus possible to use the 35th binary element position to indicate a negative sign if necessary. Although this takes longer than when the limiting process is adopted for a composition instruction, the saving brought about by omitting individual composition instructions more than compensates for any loss in time. At the end of the first numerical result long number the inlet switch does not change over but is held in the outlet feeder-aggregator position under control of the multiple instruction register. When the reconversion process is finished, the sequence control operates and generates a transfer signal as before. This signal causes such data as tabulation orders, as indicated by the multiple store, to pass to the composition control. The transfer signal also causes the multiple instruction register to move to its next position to give the recording information, etc. for the next result. In the normal way, the arithmetic unit is restored and the reconverter ready signal passed to the computer so that the next long number extracted, which also gives numerical data, can be received from the outlet feeder.

Figure 2:
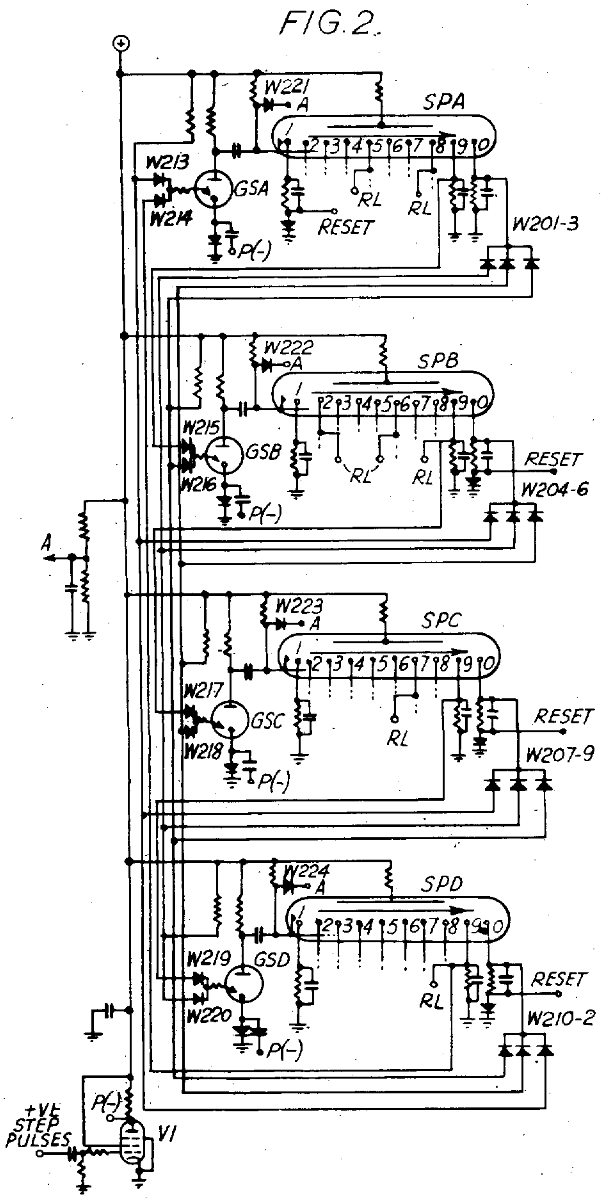
Fig. 2 shows the circuit of a step pulse counter which is a unit of the reconverter in said copending application.

STEP PULSE COUNTER (See Fig. 2)

The step pulse counter is a 36-position counting circuit which is used also as a distributor. The circuit uses four 10-point cold cathode multi-gap tubes, SPA, SPB, SPC and SPD, nine cathodes of each being used for counting purposes and the remaining cathodes providing the rest positions for the glow discharge.

When the H. T. is switched on, a relay device (not shown) is used to apply momentarily a negative potential to the reset leads (which are shown, e. g. connected to the circuit of cathode 0 of tube SPB), causing the glow in the tubes to be on cathodes, 1, 0, 0, 0 of tubes SPA . . . SPD respectively. In this position rectifiers W204–212 are biassed positively from tubes SPB . . . SPD so that the cold cathode tube gate GSA will be opened by a triggering potential applied over W213 rectifier due to the potential biasses in rectifiers W204, 207 and 212. The remaining tube gates GSB, GSC and GSD will remain closed because circuits to ground are available over rectifiers W201–203.

The bias potential A derived as shown from the H. T. supply, is applied to each of the multi-gap tube transfer electrode leads over rectifiers W221–4 respectively.

When each binary element of information in the outlet feeder is passed to the converter, a positive step pulse is applied to the grid of valve Y1 causing a negative pulse to appear at the anode. This negative pulse is fed to all the gate tubes as shown at P(−) but, since GSA is the only one which is conducting, the only multicathode tube to be influenced is SPA which steps its glow from cathode 1 to 2. Further step pulses are received, each causes SPA to take one step. When the SPA discharge reaches cathode 9, gate tube GSB will be struck via rectifier W215 due to the positive potential on SPA cathode 9. Hence when the next negative pulse is applied to the gate tubes, both SPA and SPB tubes will take one step. The removal of the bias from rectifier W214 by cathode 0 of tube SPB ceasing to conduct, extinguishes tube GSA but GSB remains fired under control of the positive biasses on rectifiers W203, 209 and 210. The step pulses now cause tube SPB alone to step until it reaches cathode 9 when tube GSC is struck by the potential across the resistance circuit of this cathode being applied to the trigger electrode of tube GSC over rectifier W217. The next pulse steps SPB to cathode 0 and SPC to cathode 1. In a manner similar to that described above, tube SPC and then SPD are caused to step. The 36th pulse steps SPD to cathode 0 and SPA to cathode 1, i. e. back to the starting condition. No further step pulses are received from the calculator for that particular "long number" item of information.

In dealing with numerical data it is not always necessary to receive a complete "long number." Under these circumstances, after the number end signal has been transmitted by the reconversion limiter, no further step pulses are received from the calculator. To reset the step pulse counter to its starting position, a negative pulse, generated from the number end pulse is applied to the reset leads so that the step pulse counter will be ready to count the next train of step pulses.

Leads from cathodes 1–9 of tubes SPA, SPB, and SPC, and 1–8 of tube SPD, i. e. 35 cathodes, are taken to the decoder circuit. No lead is required from cathode 9 of tube SPD for, as mentioned in the general description, the 36th binary element position in a long number is always left blank.

Leads RL are taken from cathodes 5 and 8 of tube SPA, cathodes 2, 6 and 9 of tube SPB, cathode 7 of tube SPC, and cathode 9 of tube SPD to the reconversion limiter so that the reconversion process can be stopped according to the number of positions required for recording a result. Four binary element positions are required for each decimal digit to be recorded and, as has been mentioned, the reconverter arithmetic unit needs one extra initial element position. Hence these interconnections between the step pulse counter and the reconversion limiter enable recognition to be achieved of 1–5, 7 and 10 decimal digit numbers to be recorded.

INLET SWITCH (See Fig. 2)

The inlet switch is used to direct the intelligence fed out from the outlet feeder either to the decoder or to the aggregator according to whether the intelligence is a composition instruction or numerical data.

Initially, when the H. T. is switched on, it is arranged that a negative potential is applied to the reset lead causing tube ISC to strike and tube ISN to be extinguished, these tubes being connected as a flip-flop pair. Thus both rectifiers W225 and W226 will be biassed positively by the cathode potential of tube ISC. The information from the outlet feeder is supplied on the M and S leads; the presence of a binary element is recorded by the M lead at positive potential and the S lead at earth and in the absence of a binary element the M lead is at earth and the S lead is positive. With ISC struck the leads to the decoder will be at a positive potential or at earth according to the state of the leads from the outlet feeder. When ISC is extinguished the leads to the decoder are at earth potential, for any positive potential appearing at rectifier W227 or W228 is presented with a low resistance path to earth over rectifier W225 or W226. The potential on the lead to the aggregator is not dependent upon the condition of the binary pair. As will be seen, the doubler tube in the arithmetic unit of the reconverter cannot step until tube ISN strikes so that the arithmetic unit cannot operate even though a potential on the M lead is applied to the aggregator.

The first "long number" from the outlet feeder will be a composition instruction which, due to the setting of the binary tube pair, will be fed to the decoder. At the end of this "long number" the reconversion limiter, on operating, generates a number end pulse which is received on the common triggering lead causing tube ISN to strike. ISN, on firing, causes a negative-going pulse to be passed via the inter-anode condenser C200, which in turn causes tube ISC to be extinguished. Rectifier W229 is now biassed positively due to the potential on the cathode of ISN and, since ISC is extinguished, the bias is removed from rectifiers W225 and W226. The information leads to the decoder are both at earth potential so that the numerical data "long number" which follows will not change the setting of the decoder.

The next step pulse to arrive, namely the first step pulse in synchronism with numerical data, causes rectifier W230 to be biassed positively for the duration of the pulse and this, in conjunction with the positive bias on rectifier W229 gives a positive pulse on the start lead to the doubler start tube. The reconversion process then proceeds as described in said copending application Ser. No. 197,206 each step pulse causing the start tube to be re-operated.

The next number end pulse from the reconversion limiter strikes tube ISC and extinguishes tube ISN and the operation described is repeated. Whilst tube ISN is struck, a positive potential is applied to the lead to the sequence control circuit which, as will later be described, enables the reconverter un-ready signal to be given to the calculator so preventing further information being applied to the M and S leads until the previous information passed to the reconverter has been transferred to the compositor.

Initially, when the H. T. is switched on, a negative potential is arranged to be applied to the reset lead causing tube ISC to strike and ISN to be extinguished. Rectifiers W225 and 226 are biassed positively so that it is possible to re-use a particular multiple instruction store for more than one set of individual results, although this is not preferred. To accomplish this it is necessary to include a counter to give the number of times of use of the multiple instruction store. When this counter record agrees with the number of required reconversions, as indicated in the foregoing multiple instruction, the inlet switch is changed over enabling another instruction to be sent.

In the following circuit explanations it will be assumed that in the decoder tube D1S struck indicates a composition instruction and D1M struck indicates a multiple instruction. Also flip-flop tube pair D2M/D2S, which provides tabulation information for a composition instruction, is now used to indicate which of the two multiple instruction stores is required for a multiple instruction. For purposes of explanation D1M and D2S struck indicate one store and D1M and D2M struck indicate the second store.

In a simple arrangement with only one multiple instruction store only one decoder tube pair (D1S/D1M) is required for proceeding with the recording for the striking of tube D1M automatically indicates the need to bring the one and only store into circuit.

Figure 3:
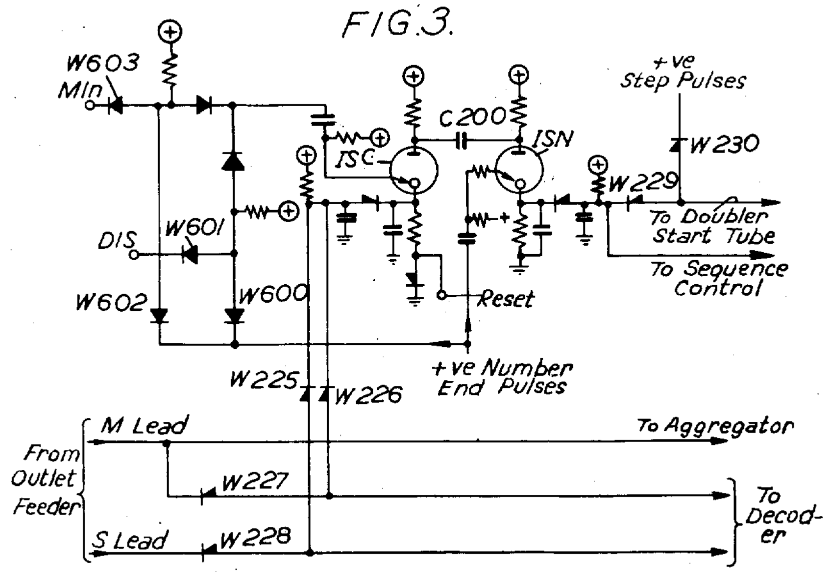
Fig. 3 shows the inlet switch of the same equipment also modified for the same purpose.

INLET SWITCH (See Fig. 3)

(*a*) *Alternate composition instructions and numerical data*

The striking arrangements for tube ISC are different from the comparable equipment described elsewhere, otherwise the circuit is the same.

Initially, when the H. T. is switched on, a negative potential is arranged to be applied to the reset lead causing tube ISC to strike and ISN to be extinguished. Rectifiers W225 and 226 are biassed positively so that information received from the outlet feeder will be passed to the decoder. The first information received is assumed to be a composition instruction and the decoder is set as required. At the end of this instruction a positive number end pulse is received from the reconversion limiter causing tube ISN to strike, ISC is therefore extinguished. Although a number end pulse is also applied to the trigger of ISC by the blocking of both rectifiers W600 and W601, since this tube had been previously struck, the resistance-capacity network in its cathode circuit removes any control from this tube. Rectifier W229 is now biassed positively due to the potential on the cathode of tube ISN and the positive bias is removed from W225 and 226.

The next long number, giving a numerical result passes to the aggregator and reconversion takes place. The next number end pulse causes ISC to strike and ISN to be extinguished.

When a multiple instruction is received from the brain, the first long number gives an indication that a multiple instruction is to follow and the particular multiple instruction store is required. It is passed to the decoder as described above, after which tube ISN is struck by the positive number end pulse. The following next extraction of information from the outlet feeder, viz. the first of the series of numerical results, passes to the aggregator. When a number end pulse is received, tube ISC is no longer allowed to strike for tube D1S of the decoder is extinguished and lead MI*n* from the multiple instruction store is at earth potential.

After the aggregator has been cleared of the reconverted number and the reconverter ready signal has been passed to the computer, the next long number is extracted from the outlet feeder and this also is passed to the aggregator.

Subsequent minor cycles will pass to the aggregator for reconversion until the multiple instruction store finally moves to its last position tube, MI*n* being fired. The last result passes to the aggregator and is reconverted. The next number end pulse causes rectifier W602 to be biassed positively for the duration of the pulse and on this occasion rectifier W603 is also biassed positively due to the potential on lead MI*n* so that tube ISC strikes and ISN is extinguished.

The next long number from the outlet feeder is either a composition instruction or the same or another multiple instruction and this is passed to the decoder.

Figure 4:
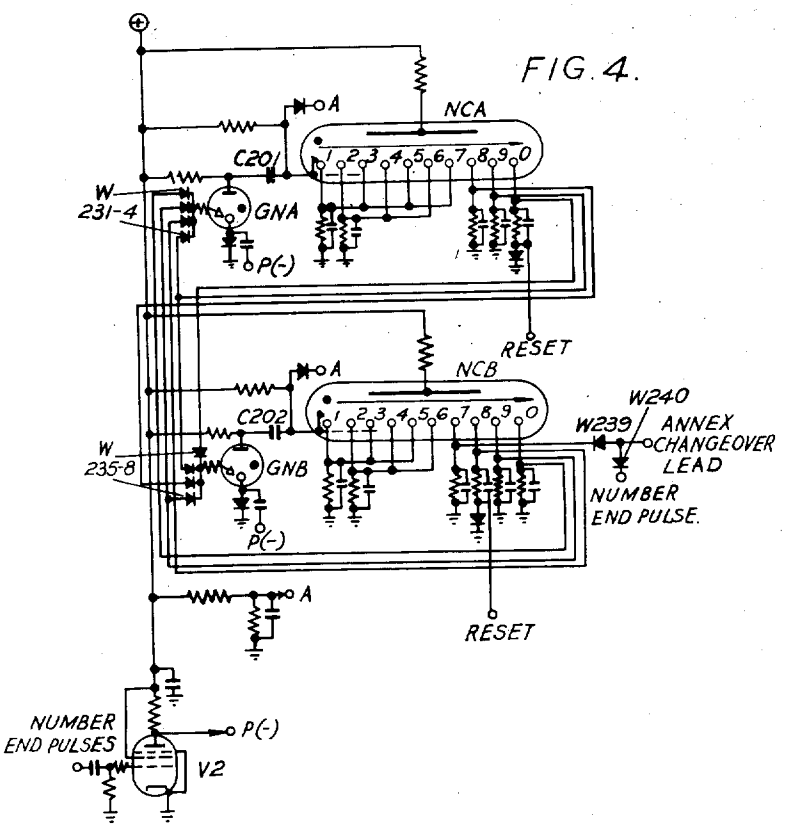
Fig. 4 is the number counter circuit which controls the passage of information from the computer to the reconverter.

NUMBER COUNTER (See Fig. 4)

The number counter is the unit used to count the number end pulses so that, when it is known that the contents of one annex tube, i. e. 16 "long numbers," have been removed into the reconverter and compositor, the calculator can switch over to the other annex tube of the pair enabling the one which has been used to be re-filled with new intelligence by the calculator.

The counter consists essentially of two gas-filled cold cathode multi-gap discharge tubes NCA and NCB. The operation of the circuit is similar to that of the step pulse counter. Number end pulses fed to the pentode valve V2 which generates negative going pulses at its anode, which latter pulses are applied via gate tubes GNA, GNB to the multi-gap counting tubes.

Initially when the H. T. is switched on, the reset device applies negative potentials to the reset leads which causes the glow discharge to appear on cathode 0 and 8 of tubes NCA and NCB respectively. The positive potential on cathode 8 of tube NCB is applied to the trigger electrode of tube GNA via rectifier W233, opening that gate and the positive potential on cathode 0 of tube NCA similarly opens tube gate GNB via rectifier W235.

When a number end pulse from the reconversion limiter is received at the grid of V2, a negative pulse generated by V2 is applied to the cathodes of both tubes GNA and GNB. These tubes therefore conduct for the duration of the applied pulse and negative going pulses are fed via condensers C201 and C202 to the commoned transfer electrodes of tubes NCA and NCB. There is a standing bias provided at the points A so that both NCA and NCB make one step. The gating tubes GNA and GNB now remain open due to the positive potential from cathode 9 of tube NCB being applied to tube GNA via rectifier W232 and to tube GNB via rectifier W238. The next number end pulse steps tube NCA discharge to cathode 2 and NCB to cathode 0; GNA remains open due to the potential from cathode 0 of tube NCB via rectifier W231 but GNB is now closed.

Further number end pulses cause NCA to step its glow discharge one cathode for each pulse. When NCA steps to cathode 8, GNB is reopened via rectifier 237; GNA remains open via rectifier 231. The next number end pulse steps the discharge in tube NCA to cathode 9 and in tube NCB to cathode 1. Both gates remain open controlled by the potential on NCA cathode 9 applied over rectifiers W234 and W238 so that the following number end pulse steps NCA to cathode 0 and NCB to cathode 2. The potential from NCA cathode 0 keeps GNB open via rectifier W235 but GNA is now closed so that the next number end pulse steps NCB only. The 15th number end pulse, counting from the beginning of the operation, steps NCB to cathode 7, so giving a positive bias to rectifier W239. When the 16th number end pulse is received rectifier W240 is also biassed positively (as it is by each number end pulse) so that a positive pulse is produced on the annex changeover lead which is connected to the calculator. The 16th number end pulse also steps NCB to cathode 8 and the number counter is now back at its starting position and is ready to count a further set of number end pulses in connection with the intelligence contained within the next annex tube to be connected to the outlet feeder.

Occasionally it will be necessary to feed out from an annex tube when there has been insufficient data to fill the tube, i. e. less than 16 long numbers. In these circumstances an indication is given in the composition instruction for the last numerical data item in the tube. Since there will no longer be 16 number end pulses to step the number counter through a full cycle of movement, it is necessary to apply a reset signal and also, since the number counter will not step to cathode 7 of tube NCB, an annex changeover pulse must be produced by other means. It has to be remembered that the annex changeover pulse must be given at the time position when there is a number end pulse at the end of a numerical data long number. It will be shown later that one section of the decoder is used to denote that the long number to follow is the last in the particular annex tube. Both the reset signal and the annex changeover pulse are therefore produced from the decoder when it is known that an annex tube has not been completely filled.

Figure 5:
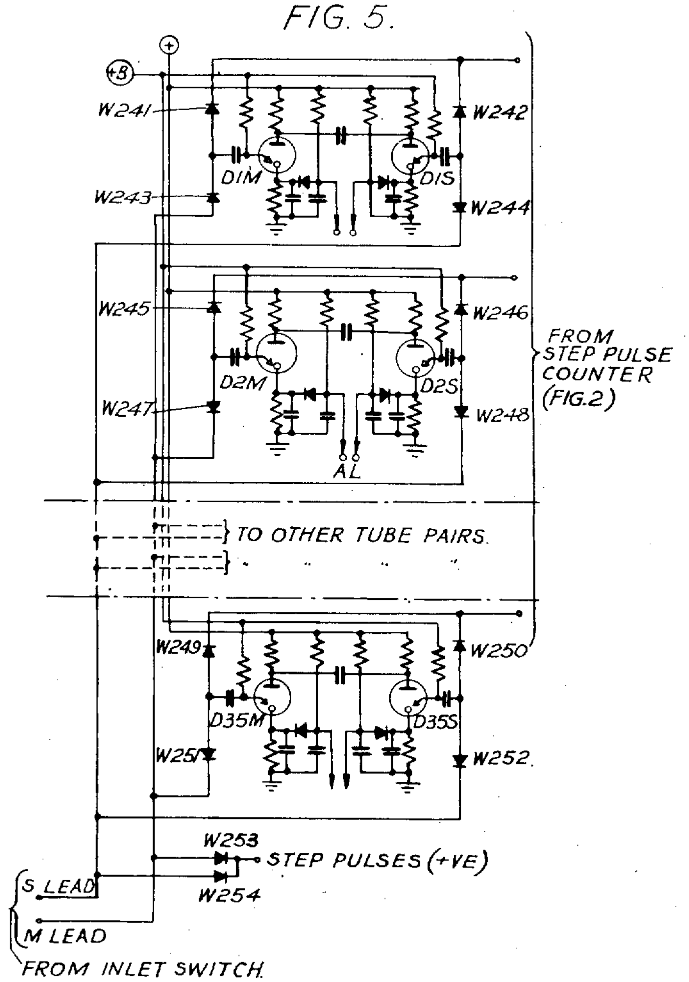
Fig. 5 is the decoder to which certain of the information from the computer is fed.

DECODER (See Fig. 5)

The decoder is used to register the composition instruction. Its main constituents are 35 flip-flop pairs of discharge tubes, D1M, D1S; D2M, D2S; D35M, D35S. Since use is made of flip-flop pairs there is no necessity to have any resetting arrangements for intelligence previously registered is replaced by the art of registering new intelligence. There are 35 binary element positions available to pass a composition instruction although all of these may not be required. There is one flip-flop tube pair provided for each element position and each pair is associated with the multi-gap tube cathode of the step pulse counter which corresponds to the position of the element in the long number, e. g. the first element position is associated with cathode 1 of tube SPA, the second with cathode 2 of tube SPA and the thirty-fifth with cathode 8 of tube SPD.

When a composition instruction is being received, the M and S leads will be at positive and earth potential respectively or vice versa. The information is passed forward from the inlet switch over these leads concurrently with the receipt of the step pulses. To illustrate the operation of the circuit it will be assumed that in the composition instruction there is a positive potential on the M lead for the first element position, a positive potential on the S lead for the second element position and a positive potential on the M lead for the thirty fifth element position. In each of these cases the other lead is at earth potential.

Before the first step pulse is received the step pulse counter provides potential from cathode 1 of tube SPA, to bias positively rectifiers W241 and W242. Paths are available from rectifiers W245–6, 249 and 250 to earth via the step pulse counter. When the first step pulse is received both rectifiers W253 and W254 are biassed positively and, in this example, the M lead also is at a positive potential. Thus a positive pulse is supplied to rectifiers W243, 247 and 251 blocking them, but not to rectifiers W244, 248 and 252. As a result of rectifier W241 being blocked and W245 and 249 not being blocked a positive pulse is applied to the trigger of tube D1M. This causes it to strike if D1S had been struck previously or it leaves D1M struck if it had been previously conducting. No other pair of tubes is affected. The step pulse which causes D1M to strike also steps the step pulse counter to cathode 2 of tube SPA so that now rectifiers W245 and 246 are biassed positively. The rectifiers W241—2—9 and 250 are all provided with paths to earth via the appropriate cathode circuits of the step pulse counter.

On receipt of the second step pulse, the S lead is at a positive potential so that a positive pulse appears at the trigger electrode of tube D2S causing this tube to strike if it is not already conducting. Subsequent step pulses set the intermediate flip-flop pairs as required under control of the M and S leads. The 34th step pulse steps the step pulse counter to cathode 8 of tube SPD so that rectifiers W249 and 250 have a positive bias. With the arrival of the 35th step pulse the M lead is positive and, in consequence, tube D35M is struck. The decoder is now set in accordance with the received composition instruction.

As explained previously, at the end of the composition instruction long number the inlet switch changes over so that during the numerical data long number both the M and S leads will be held at earth potential. Thus the decoder flip-flop pairs will not be affected by the binary element pulses making up the numerical data.

Figure 6:
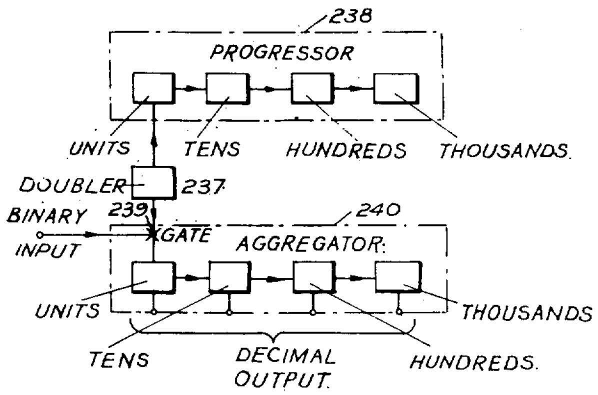
Fig. 6 is a block schematic diagram of the arithmetic unit to which the remainder of the information is taken.
Figure 7:
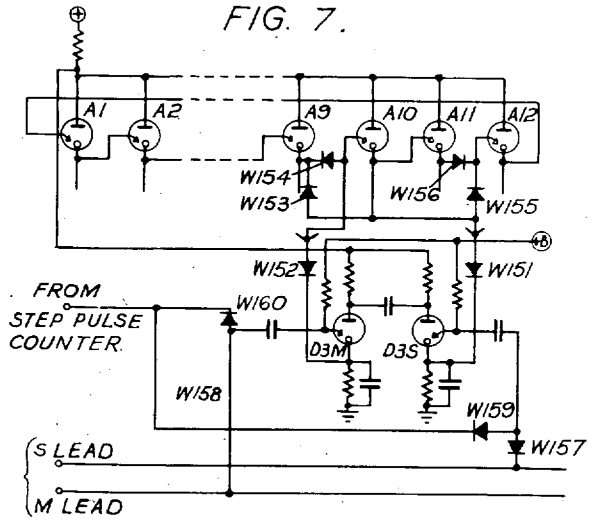
Fig. 7 shows the arrangement for controlling the operation of the arithmetic unit which arrangement is dependent on whether the unit is required to deal with decimal or sterling information.

ARITHMETIC UNIT (See Figs. 6 and 7)

Fig. 6 shows a block schematic of the arithmetic unit. Such equipment as has already been mentioned, has been previously described in said copending application Ser. No. 197,206. A brief outline of the purpose and operation of the unit will now be given.

The circuit is required to produce the decimal or sterling equivalent of a pulse train presented to it in binary code form. The fundamental part of the circuit is the so-called doubler 237 which is a pulse generator arranged to produce in successive cycles trains of pulses with geometrically progressive increases i. e. trains of 1, 2, 4, 8 . . . pulses. All of these pulses are fed to the progresser 238 (or accumulator as it is termed in the above application) wherein their total is registered, say in decimal form, indications being given of the units, tens . . . digits. The pulses are also fed via a gate 239 to an aggregator circuit 246. If this gate is open then the aggregator, which has an identical circuit to the progresser, will also record the total of pulses generated by the doubler. However the gate is controlled by the number whose notation is to be converted so that the presence of a pulse representing binary digit 1 in a number opens the gate whilst it remains closed when the binary digit is 0.

The pulses representing the number to be converted are presented to the gate 239 in turn with the lowest significant binary digit pulse position first. If a pulse is present the gate is opened. Thereafter the remainder of the pulse positions in order are fed to the gate in synchronism with the cycles of operation of the doubler. Consider the conversion of a binary number 1011 during four cycles of the doubler.

The operation is as follows:

| Cycle | Doubler Pulse Trains, Numbers of Pulses | Pulses to Progresser | Binary Digits | Gate | Pulses to Aggregator |
|---|---|---|---|---|---|
| 1 | 1 | 1 | 1 | Open | 1 |
| 2 | 2 | 2 | 1 | Open | 2 |
| 3 | 4 | 4 | 0 | Closed | 0 |
| 4 | 8 | 8 | 1 | Open | 8 |
| Total |  | 15 |  |  | 11 |

Eleven pulses, giving the decimal equivalent of the binary number 1011, are seen to be passed to the aggregator. An indication can be given from the aggregator of the result. For instance the different order compartments of both the progresser and the aggregator may each comprise a ten-gap gas-filled glow discharge tube. Hence the position of the glow discharges in the aggregator tubes is simply indicated by the conducting state of the appropriate cathodes which gives rise to an indicating potential at the cathode developed across the cathode resistance. Such cathode potentials can be used for marking terminals corresponding to individual cathodes. A similar procedure is followed when counting rings of ten individual tubes are used instead of multi-gap tubes for each of the different digital orders.

In the embodiment being described of the present invention the progresser and aggregator do use individual tube counting rings rather than multi-gap tubes. However in order to cope with reconversion of binary numbers both to decimal and to sterling form the least significant and third significant order compartments in both the progresser and aggregator contain respectively provision for rings of twelve and of two as well as rings of ten. The reason for this arrangement will now be explained.

A decimal number is one in which each digital position has the radix 10. A sterling value is merely a numerical expression in which the least significant digit (pence) has a radix 12, the next (units shillings) has a radix 10, the next (ten shillings) has a radix 2, and the remaining digits (pounds) each have a radix 10. If A is the least significant position, B the next higher, etc., the radices are as follows:

| | A | B | C | D | All Higher Positions |
|---|---|---|---|---|---|
| Decimal | 10 | 10 | 10 | 10 | 10 |
| Sterling | 12 | 10 | 2 | 10 | 10 |

From this it can be seen that the only variations are for positions A and C.

Order positions A and C are those for which the rings-of-ten and -twelve and the rings-of-ten and -two respectively are provided. A simple switching arrangement is necessary to change over from the decimal to the sterling reconversion process and this is controlled by one element in the composition instruction. For the purposes of illustration it will be assumed that the third element position in the composition instruction is reviewed by the decoder to establish whether the following number is to be in sterling or decimal notation. Furthermore it will be assumed that a pulse in this position, i. e. a "mark," passed from the inlet switch to the decoder, represents a sterling number to follow.

Fig. 7 shows the appropriate tubes D3M and D3S isolated from the remainder of the decoder and connected, for example, to the ring of ten/twelve provided for the "A" order position in the aggregator. The same pair of decoder tubes also controls the operation of the corresponding "A" order ring in the progresser in an identical way and of the "C" order ten/two rings in the progresser and aggregator in a similar way to be explained later.

The ring of twelve individual tubes A1 . . . A12 is shown in schematic form only. Such counting rings are well known. In this particular one A1—A12 is a ring counter composed of trigger tubes. In the rest condition A12 is struck the other tubes being extinguished. The circuit arrangement is such that each tube is used to prime the next in sequence, so that when pulses are applied to the circuit A1 strikes, so extinguishing A12; then A2 strikes, extinguishing A1, etc.

If the number which follows the composition instruction is decimal, tube D3S is struck due to the potential on the S lead blocking rectifier W157 and by the step pulse counter pulse blocking rectifier W159, thereby forwarding a triggering pulse to the tube and D3M is extinguished, whereas, if the number which follows is in sterling, D3S is extinguished and D3M is struck.

For a decimal reconversion rectifier W151 is biassed positively from the cathode of tube D3S and rectifier W152 is at earth potential. When the aggregator has stopped so that A9 is struck both rectifiers W153 and 154 are biassed positively; these biasses in conjunction with those on W151 and M2 cause A12 to be primed via rectifier W155. A10 is not primed. Thus the next pulse to be applied causes A12 to strike instead of A10. Tubes A9 and A10 have been cut out of the counting arrangement, the counter behaving as if it were a scale-of-10.

In a sterling reconversion rectifier W151 is at earth potential and W152 is biassed positively by reason of the cathode potentials of D3M and D3S. When the counter reaches A9, and W153 and W154 are biassed positively again, tube A10 is primed and not A12, and the next pulse causes the counter to step to A10 and the following one to A11. A12 is now primed via rectifier W156 so that the next step is to A12 and the counter has performed as a scale-of-12. W155 and W156 are blocking rectifiers to prevent interaction between the priming sources of tube A12.

The counter used for the "C" order position is similar to that for the A digital position but requires ten trigger tubes only, A1–A10. Furthermore, instead of the cathode of A9 co-operating with the decimal/sterling decoder tubes as for the "A" order position, for the "C" order position the cathode of A1 co-operates with the decimal/sterling decoder. By this means it is arranged that the cycle of counting is A1, A2 . . . A10 for a decimal reconversion and A1, A10 for a sterling reconversion.

Figure 8:
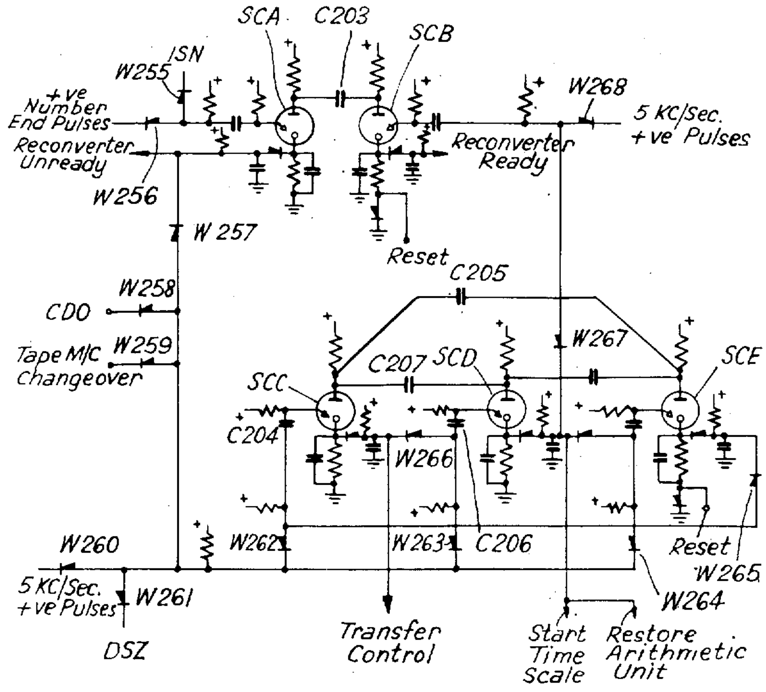
Fig. 8 is the circuit diagram of the sequence control which accomplishes the transfer of information from the reconverter to the compositor, the latter controlling the recording of information.

SEQUENCE CONTROL (See Fig. 8)

The sequence control circuit is used to effect the transfer to the compositor of the information registered in the reconverter and to free the reconverter for further use whilst a record is being made of the result already obtained. At the same time the sequence control is responsible for informing the calculator whether or not the reconverter is ready to receive further intelligence.

The sequence control unit is made up of two main circuits. The first comprises a flip-flop pair of tubes SCA, SCB, which is arranged to give the reconverter ready and un-ready signals to the calculator. Further instruction signals are given by the interconnected tubes SCC, SCD and SCE only one which can be conducting at once.

When the H. T. is switched on a negative potential is arranged to be applied momentarily by means of a relay device (not shown), to the reset leads. This causes tubes SCB and SCE to be fired. Because tube SCB is conducting the reconverter ready lead is raised to a positive potential by the current passing through the cathode resistance, so indicating to the calculator that the outlet feeder can transmit its contents to the reconverter. No further operation takes place in the sequence control until this information has all passed to the reconverter.

For the reception of the numerical data, the inlet switch is positioned so that tube ISN (Fig. 2) is struck. Hence there is a positive bias on rectifier W255. At the end of the reconversion process a positive number end pulse is generated by the reconversion limiter which is then applied to rectifier W256. The rectifiers W255 and 256 provide a gating circuit in known manner and when both are blocked by applied positive potential, a triggering potential is forwarded to tube SCA, which fires, so extinguishing SCB via the inter-anode condenser C203. The positive potential now derived from the cathode of SCA provides the reconverter un-ready signal which prevents the calculator from passing further intelligence until the contents of the reconverter can be transferred to the compositor. The cathode potential of SCA is also used to give a positive bias to rectifier W257.

Since the circuit is assumed to be dealing with the first long number from the calculator the composition distributor is at its rest position, designated CDO, and rectifier W258 is provided with a positive bias. Also, assuming there is a magnetic storage unit tape machine connected to the code transmitter, rectifier W259 is biassed positively over the tape machine changeover lead. The step pulse which initiates the number end pulse also operates the doubler start tube in the arithmetic unit. Hence although there are no further significant elements in the numerical data the doubler performs one more cycle of operation. During this time rectifier W260, which is connected to the cathode of the doubler stop tube, will be provided with a path DSZ to earth. However, at the end of this cycle the stop tube operates and thereafter rectifier W260 is biassed positively over lead DSZ. Thus a positive pulse now applied to rectifier W261 causes a positive pulse to appear at the common point of rectifiers W262—3 and 264. Pulses are applied to the rectifier W260 at 5 kc./s. frequency from a local generator. Of the three tubes SCC, SCD and SCE, SCE only is struck. Rectifier W265 is therefore provided with a positive bias and this, in conjunction with the bias on rectifier W262 causes tube SCC to strike by forwarding a triggering potential over condenser C204. SCC, on firing, forwards a pulse, over the inter-anode condenser C205, to extinguish SCE. A positive potential is now applied to the transfer control lead from the cathode of tube SCC. As will later be shown, this permits the transfer to the compositor of the intelligence in the reconverter.

Rectifier W266 is now biassed positively from the SCC cathode so that the next 5 kc./sec. pulse applied to rectifier W260, is fed over rectifier W263 and condenser C206 to fire tube SCD. SCD, on firing, extinguishes SCC over condenser C207. The potential derived from the cathode of SCD is applied to the "start time scale" and "restore arithmetic unit" leads. The positive potential on the restore lead is used to generate a negative pulse which resets the progresser and aggregator to their zero positions so that the arithmetic unit is once again ready for a reconversion process. The potential from the cathode of SCD is applied also to rectifier W267; the next 5 kc./sec. pulse not only steps the sequence control from SCD to SCE but also causes SCB to strike, by applying a triggering potential from the rectifier gate circuit W267/W268, and to extinguish SCA. The reconverter ready signal is returned to the calculator from the cathode of tube SCB and new intelligence can be passed to the reconverter.

If during an operation the composition distributor is still dealing with one result when the next result is waiting to be transferred from the reconverter, SCA is retained in operation to give the reconverter un-ready signal and transfer cannot take place. This happens because the composition distributor is away from its rest position, and, in consequence, rectifier W258 is provided with a path to earth. Thus SCC is not allowed to strike. When the recording is complete the composition distributor returns to its rest position so that further operations of the sequence control can take place.

In a similar manner, when one tape machine has been filled and the tape machine distributor is changing over to the next tape machine, until the changeover is complete an earth is applied to the tape machine changeover lead so keeping rectifier W259 to earth and preventing the operation of the sequence control. The earth condition is changed to a positive potential when the new tape machine is ready to record results.

Figure 9:
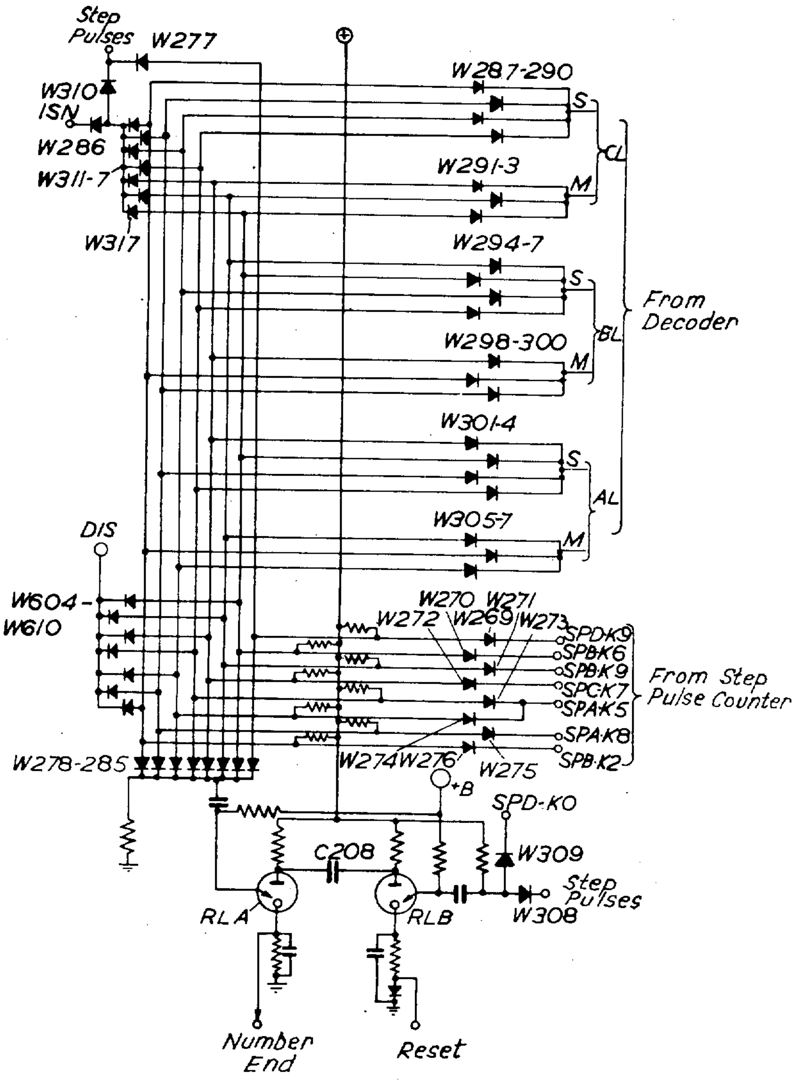
Fig. 9 shows the modified reconversion limiter circuit.

RECONVERSION LIMITER (See Fig. 9)

The reconversion limiter is the unit used to produce the number and signal which, apart from its uses in the reconverter, is used to inform the calculator that the existing contents of the outlet feeder have been passed to the reconverter and the next intelligence can be transmitted when the calculator is ready to pass it. The reconversion limiter also provides the facility of stopping the reconversion process when it is known that no further significant elements are present in the result which is undergoing reconversion.

A long number consists of 36 binary element positions, 35 of which are used to denote a number. These elements can be used to give the equivalent in binary notation of numbers up to $9.9\times10^9$ expressed in decimal form. The results which are most often encountered in practice contain far fewer significant digits. As has already been suggested, a saving in time can be effected by carrying out the reconversion process only as far as is necessary for the significant digits in the result received from the calculator. The operation of the arithmetic unit requires in addition one element giving time in which to accomplish the carry-over function. The following table gives the relationship between the number of decimal positions, the equivalent number of binary elements and the number of binary elements required by the arithmetic unit.

| Decimal Positions | Equivalent Binary Elements | Required Binary Elements |
|---|---|---|
| 1 | 4 | 5 |
| 2 | 7 | 8 |
| 3 | 10 | 11 |
| 4 | 14 | 15 |
| 5 | 17 | 18 |
| 6 | 20 | 21 |
| 7 | 24 | 25 |
| 8 | 27 | 28 |
| 9 | 30 | 31 |
| 10 | 34 | 35 |

It can be seen from the above that little saving in time is effected by any conversion limiting where decimal numbers having 8 or more digit positions are to be recorded. Furthermore, since information relating to number of positions is passed in a composition instruction it is advisable to limit the number of instruction element positions required for this purpose. In the embodiment being considered, it is proposed to use 3 element positions in the composition instruction to pass this information; this gives a means of recognising 8 different possibilities in the number of decimal positions. In addition to these cases there will be others when it is required to produce additional composition instructions, e. g. tabulation signals, for a result. To carry this out a 0-position number is assumed to follow the composition instruction. The limiting positions are therefore taken as 0, 1, 2, 3, 4, 5 and 7. The eighth condition is used to denote a 10-position number but this is arranged not to cause any limiting action. A 6-position number is not considered as such; instead all results which are known to contain 6 decimal positions will be considered as if they were 7-position numbers. Since the calculator requires a minimum time interval between consecutive number end signals, a 0-position number is considered, for the purposes of reconversion limiting as if it were a 1-position number.

Assume that tubes D3M and D3S are one pair of tubes in the decoder (Fig. 5) relating to one composition instruction element position distinguishing number of decimal positions. The presence of a pulse fires tube D2M so that a mark-representing potential is forwarded from the cathode of this tube. Leads are taken from D2M and D2S and designated AL. They provide the input to the reconversion limiter and are shown in Fig. 9. The two further tube pairs devoted to these signals mark similar leads B1 and C1.

The number of positions information contained in the composition instruction is registered in the appropriate section of the decoder. The decoder settings for the different numbers of positions are as follows:

| Number of Positions | Decoder Setting | | |
|---|---|---|---|
| | AL | BL | CL |
| 0 | S | S | S |
| 1 | M | S | S |
| 2 | S | M | S |
| 3 | M | M | S |
| 4 | S | S | M |
| 5 | M | S | M |
| 7 | S | M | M |
| 10 | M | M | M |

The reconversion limiter comprises a flip-flop tube pair, RLA and RLB and an extensive rectifier gating circuit containing rectifiers W269 to W316. The latter circuit is fed by step pulses, potentials from the decoder tube pairs dealing with number of positions indications, and by potentials from certain cathodes (designated K1 to K0) of the multi-gap tubes SPA . . . SPD in the step pulse counter.

The operation of the circuit will now be considered.

Initially tube RLB is struck when the H. T. is switched on, by the momentary application to the reset lead of a negative potential. When a composition instruction is received from the decoder, the lead from the inlet switch, ISN is grounded so that no potentials applied over leads AL, BL and CL from the decoder will affect the trigger electrode of tube RLA. There are received 35 binary elements to register the composition instruction and this requires 35 step pulses. The step pulse counter therefore steps to cathode 9 of tube SPD and a positive bias is applied over lead SPD—K9 to rectifier W269. The next step pulse, which causes the step pulse counter to return to its home position, applies a positive pulse to block rectifier W277 and because W269 is blocked a positive pulse is fed over decoupling rectifier W285 to the trigger electrode of RLA which strikes and via condenser C208 extinguishes tube RLB. The cathode of RLA provides a positive potential from which a positive number end pulse is generated. This number end pulse changes over the inlet switch so that the lead ISN acquires a positive potential which blocks rectifier W286. The circuit is now ready for operation upon the numerical data long number.

To illustrate further operation it will be assumed that the result to be reconverted is known to have a maximum of 5 decimal positions. The setting of the decoder for recognising this instruction will been seen from the above table to be MSM. Rectifiers W291—3, W294—7 and W305—7 are all biased positively from the decoder and the other rectifiers connected to the AL, BL and CL leads are all at earth potential. The arrangement is such that the only combination of biased rectifiers which presents a positive potential to any one of rectifiers W278—285 is rectifiers W292, 294 and 305, all of which are connected to rectifier W283. As the first step pulse is received for the numerical date rectifier W308 becomes positively biased and since, at this time, the step pulse counter has a discharge at cathode 0 of the tube SPD, rectifier W309 is also biased positively so that tube RLB strikes, restoring the flip-flop pair. When the correct number of binary elements for a 5 decimal position number have been received the stop pulse counter is discharging at cathode 9 of tube SPB, viz. the step pulse counter has made 17 steps indicating that 17 binary elements have been received. Rectifier W271 has a positive bias from lead SPB—K9. The next pulse, which provides the arithmetic unit with the additional element position, applies a positive pulse to rectifier W310. In combination with the bias on rectifier W286 this applies a positive pulse, to MR4. Thus, for the duration of the step pulse, rectifiers W316, 292, 294, 305 and 271 are all simultaneously biased positively so that tube RLA is struck via rectifier W283. Again the positive potential on the cathode of RLA produces the number end pulse which, when received by the calculator, prevents further step pulses being transmitted and any attempt to transfer further information elements to the reconverter.

For those cases in which the size of result is not known beforehand, or if it is greater than 7 positions, the decoder is set to register MMM. The number end signal is then given when the whole long number has been received just as in the case of a composition instruction, i. e. when the step pulse counter has stepped to a position providing a positive potential to lead SPD—K9.

RECONVERSION LIMITER (See Fig. 9)

For operation with alternate composition instructions and numerical data, the reconversion limiter operates as previously described, that is, the number end signal is given and no further elements are emitted from the outlet feeder when it is known that all significant elements have been received. However, in the case of a multiple instruction the complete long number must be received for every result and no limiting takes place. To cater for the multiple instructions rectifiers W604—610 are used. These rectifiers W604—610 are connected to the cathode of tube D1S in the decoder.

(*a*) *Alternate composition instructions and numerical data*

When a composition instruction is being received RLA strikes due to the positive potentials applied to rectifiers W269 and 277 when the step pulse counter is standing on its 36th position, i. e. with counter tube SPD fires at its ninth cathode.

When the composition instruction has been received positive and earth potentials are applied to the M and S leads from the decoder so biassing certain of the rectifiers W287 to 307 to indicate the number of elements in the following result. For this method of operation lead D1S is at a positive potential and rectifiers W604—610 are biassed positively. Thus, when the correct number of elements in the result have been received, the appropriate rectifiers are biassed positively so that the next step pulse applied to rectifier W286 causes tube RLA to strike, so producing the number end signal.

(*b*) *Multiple instruction*

For this method of operation lead D1S is at earth potential so that RLA cannot strike via any of the rectifiers W278-284. Instead this tube strikes only when the step pulse counter reaches SPD cathode 9 and so biasses rectifier W269. Hence for both the initial instruction and the following numerical results, the reconversion limiter operates when complete long numbers have been received. This makes it possible to use the 35th binary element position for passing further information e. g. that a result is negative.

Figure 10A:
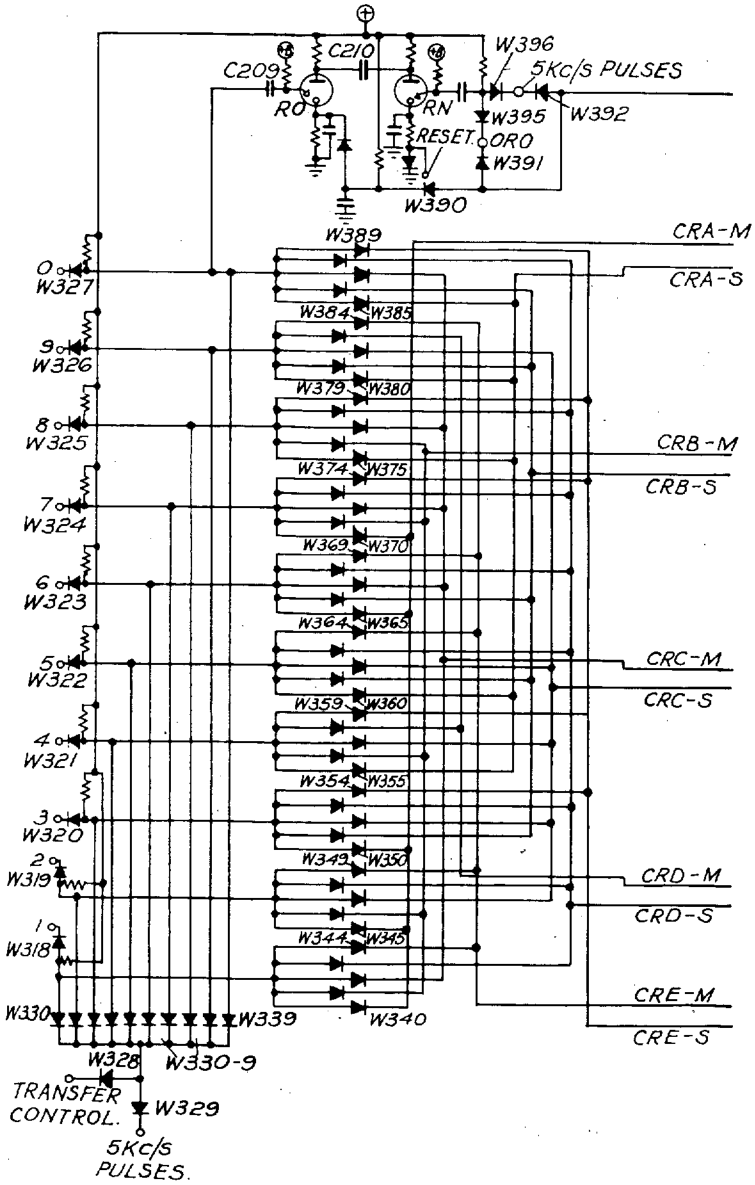
Fig. 10A is one of the coders in the compositor by means of which reconverted information is coded into a form suitable for recording.
Figure 10B:
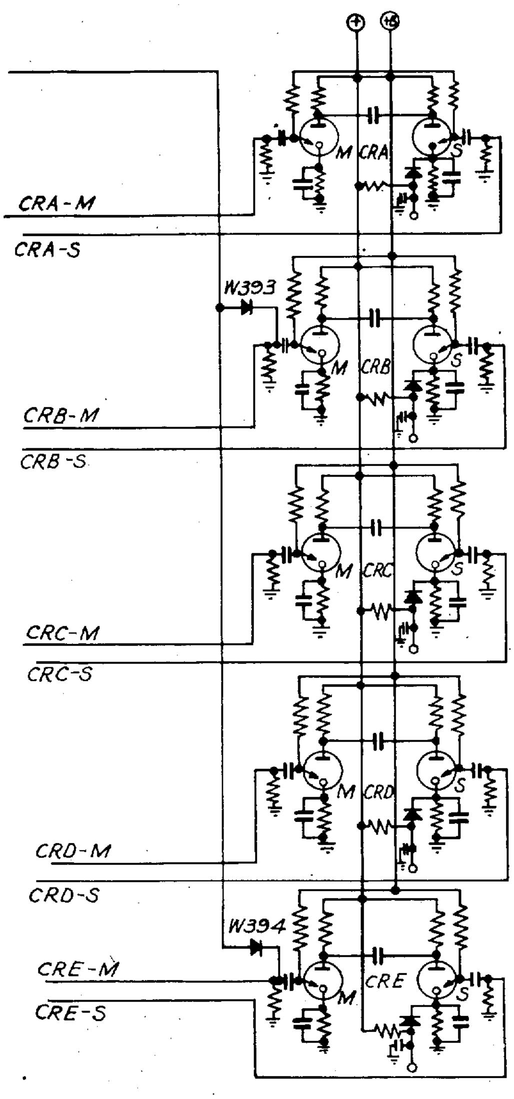
Fig. 10B is a register which stores the coded information obtained from the Fig. 10A circuit.

CODER AND REGISTER (See Figs. 10A and 10B) which together constitute Fig. 10

The coder is a rectifier network shown particularly in Fig. 10A used to translate a numerical result as recorded in the aggregator of the arithmetic unit to the particular code used for recording on the tape of the magnetic storage unit. The register (Fig. 10B) is used to store this numerical result when it is so coded. In addition to translating and registering the result produced in the arithmetic unit, provision is also made to deal with any intelligence in the composition instruction which has been passed to the decoder but which has to be recorded. Intelligence in the decoder is dealt with in a similar manner to that which will now be described for one digit in a numerical result. Registers and coders are provided on a basis of one for each character which has to be passed from the reconverter to the compositor.

The code assumed in Fig. 10A is the International Telegraph Alphabet No. 2 which is as follows:

| Character | Code |
|---|---|
| 1 | MMMSM |
| 2 | MMSSM |
| 3 | MSSSS |
| 4 | SMSMS |
| 5 | SSSSM |
| 6 | MSMSM |
| 7 | MMMSS |
| 8 | SMMSS |
| 9 | SSSMM |
| 0 | SMMSM |
| Space | SSMSS |

Fig. 10 shows a circuit dealing with one digit of a result, five flip-flop tube pairs CRA . . . CRE being used for registering the five variable elements as M or S. It should be emphasized here that similar circuits are provided for every digit in a result, transfer of all digits from the reconverter to the coder and register being simultaneous. Consider that the particular digit recorded by the aggregator is 1. A positive potential is then applied to terminal 1 to block rectifier W318 but rectifiers W319—327 remain connected to earth. When the transfer control lead from the cathode of tube SCC in the sequence control circuit acquires a positive potential rectifier W328 is also given a positive bias. The 5 Kc./sec. positive pulse which steps the sequence control to the next position also applies a positive pulse to block rectifier W329 and this in conjunction with the positive bias on W328 causes a positive pulse to be applied to rectifiers W330—9. Since W318 is the only rectifier in the leads to the aggregator which has a positive bias, a positive pulse is applied to the decoupling rectifiers W340—4 but no pulse is applied to any of the rectifiers W345—389. It will be seen that W340—4 are connected respectively to the triggers of tubes CRA—M, CRB—M, CRC—M, CRD—S and CRE—M. In consequence, these tubes strike, extinguishing the other tubes in the flip-flop pairs if any of these tubes had been previously conducting. The tubes struck denote MMMSM which is the telegraph code denoting the digit 1. The setting of the flip-flops is accomplished in a similar way for digits 2—9, the connections being such as to produce the codes shown in the above table.

In the event that the digit given by the aggregator is 0, a different operation follows. A requirement already mentioned above is that zeros before a significant digit shall be recorded as space characters but zeros after a significant digit shall be recorded as 0 characters. The flip-flop tube pair, RO—RN (Fig. 10A) is used in combination with the output reader, to be described later, to effect this requirement. When the H. T. is switched on, it is arranged that a negative potential shall be applied momentarily to the reset lead causing RN to strike. When the transfer function is carried out, since rectifier W327 is biased positively when the digit is 0, a positive pulse is applied to the decoupling rectifiers W385—9 causing tubes CRA—S, CRB—S—CRC—M, CRD—S and CRE—S to strike, giving the space character, SSMSS. At the same time a positive pulse is applied over condenser C209 to the trigger electrode of tube RO, striking this tube and extinguishing RN through the action of condenser C210. At this stage ORO, the connection from the output reader, is at earth and so the positive bias from the cathode of RO on rectifier W390 has no effect. Thus, if this digit is transmitted a space character will be recorded. However, if during the transmission of the result a character other than space is detected by the output reader, the latter operates, the connection from ORO becomes positive and rectifier W391 is given a positive bias. The next 5 kc./sec. pulse after this applies a positive pulse to rectifier W392 and the combination of the biases on W390—2 causes CRB—M and CRE—M to strike via rectifiers W393 and 394 (Fig. 10B) respectively. The flip-flop pairs now register SMMSM, i. e., the 0 character. Although all registers which have been set up to record space instead of 0 characters are changed by their operation, the result recorded gives zeros at those only decimal positions which follow a digit other than a space as detected by the output reader. The zero recording flip-flop is returned to its normal position at the same time as the character is changed from space to zero. This is accomplished by means of the biases applied to rectifiers W395—6.

If there is a requirement for zeros before a significant digit to be suppressed entirely instead of being replaced by spaces, the potentials on the cathodes of RN and RO may be used to switch out the pertinent sections of the composition distributor.

Figure 11:
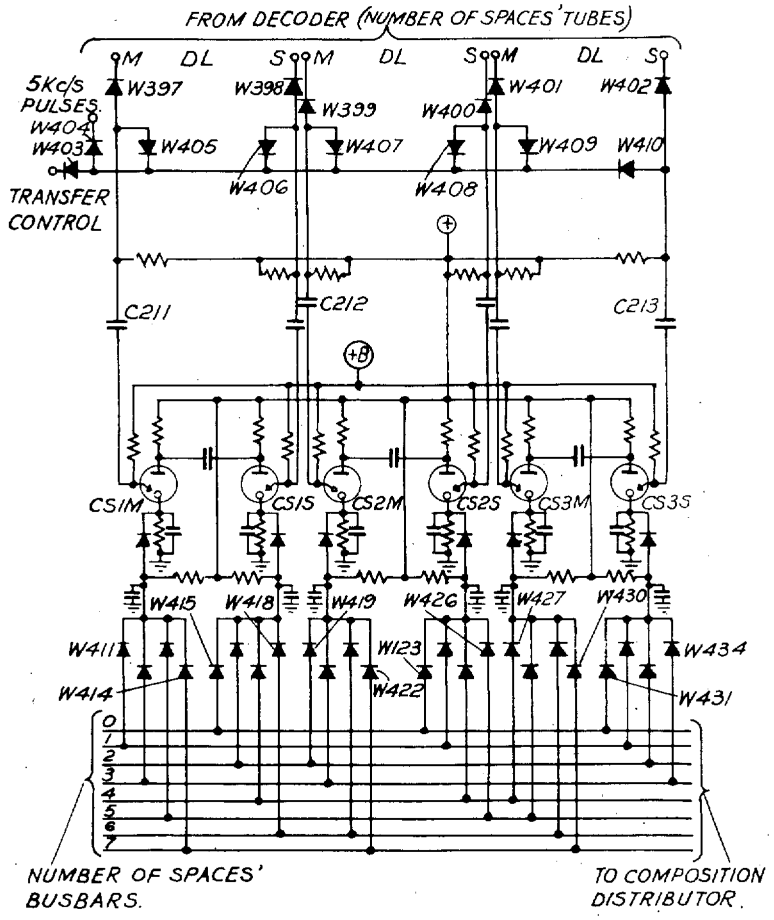
Fig. 11 shows the composition control apparatus which sets the composition distributor in accordance with the recording requirements individual to each particular result from the computer.

COMPOSITION CONTROL (See Fig. 11)

The composition control is the unit used to reregister that intelligence, passed to the decoder in the composition instruction, which is required to ensure that the composition distributor will be set in accordance with requirements. Such intelligence includes tabulation information, e. g. number of spaces required before a number, and particulars relating to the result, e. g. position of the integer point.

Fig. 11 illustrates that part of the composition control which is used to re-register the "number of spaces" information. It is assumed that there is a requirement for a maximum of 7 spaces, although it should be understood that by using a 0-position number it is possible to increase this number of spaces as desired. The number of spaces information is registered on a binary basis using three flip-flop pair tubes CS1M/CS1S, CS2M/CS2S, and CS3M/CS3S. For example, if the requirement is 3 spaces, the three appropriate pairs of decoder tubes are set respectively to mark the decoder leads D1, M, M and S. Thus, rectifiers W397, 399 and 402 are biased positively whilst W398, 400 and 401 will be at earth potential. When the sequence control steps to the condition in which tube SCC, is operated, the transfer control lead becomes positive, so giving rectifier W403 a positive bias. The 5 kc./sec. positive pulse which steps the sequence control to the next position applies a positive pulse to rectifier W404, and in consequence, rectifiers W405—410 are biased positively for the duration of the pulse. Triggering potentials are therefore forwarded to tubes CS1M, CS2M and CS3S over condensers C211, 2 and 3. The tubes strike, extinguishing the other tubes of each pair if these were already struck. Rectifiers W411—414, W419—422 and W431—434 are now blocked by a positive potential and rectifiers W415—418, W423—426 and W427—430 are taken to earth via their respective tube cathode ground connections. The combination of the positive potentials on rectifiers W412, 420 and 434 causes the busbar indicating a requirement of 3 spaces to be at a positive potential whilst all the other busbars remain at earth potential.

A similar procedure is carried out for all other items of information which have to be transferred from the decoder to the composition control.

Figure 12:
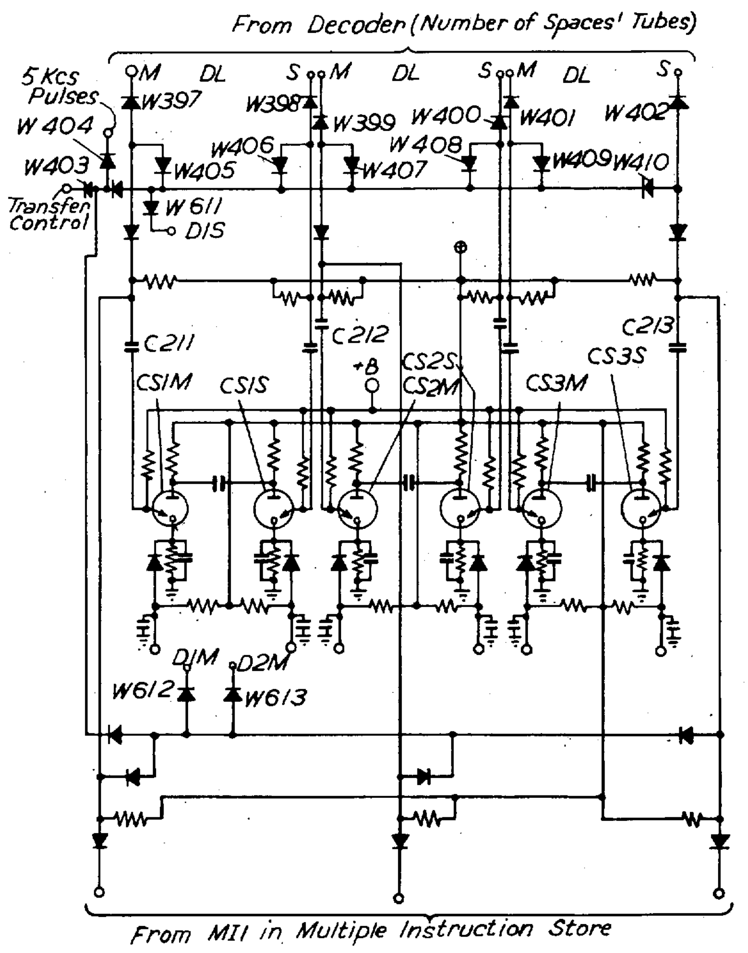
Fig. 12 shows the modified composition control circuit.

The above description with reference to Fig. 11 is solely applicable to the operation of the composition control apparatus when responding to individual instructions. When responding to multiple instructions the circuit shown in Fig. 12 operates. The full circuit, includes the busbars and rectifier gates W411 to W434 shown at the bottom of Fig. 11 and the gate network controlled by D1M and D2M and the multiple instruction store shown in Fig. 12. In fact, the cathode circuits of the tubes in Fig. 12 include terminals which are connected to the gate network shown in Fig. 11 but not in Fig. 12. Fig. 12 also includes a rectifier gate W611 controlled by D1S which is not in Fig. 11.

Hence the full circuit is a combination of Figs. 11 and 12, the circuits having been split in this manner to facilitate explanation.

The connection from tube MI1 in the multiple instruction store is made as required for the first numerical result in the sequence; in the diagram it has been assumed that 3 spaces are required. Furthermore, it should be understood that other connections would be made from MI2–MI*n* as required for the particular multiple instruction.

The operation of the circuit is very similar to the description given earlier. Controlling potentials applied to connections D1S and D1M from the corresponding decoder tubes bias rectifiers W611 and 612 accordingly so that when the transfer control lead becomes positive so blocking rectifier W403 the composition control tubes CS1M, CS1S are set either by the information received from the decoder over leads DL or by the multiple instruction store. If D1S is positive and D1M is at earth, indicating that alternate composition instructions and numerical results are being received, the composition control tubes are set by the decoder but if D1S is at earth and D1M is positive, indicating a multiple instruction, the composition control is set according to the pre-set permanent connections from tube MI1 in the multiple instruction store. Similarly, if a multiple reconversion process is being carried out, when the second numerical result is transferred from the aggregator, the composition control is set according to the connections from MI2, and so on for all other results.

Rectifier W613, connected to the D2M lead is used to differentiate between the different multiple instruction stores, assumed in this embodiment to be two. In Fig. 12 it has been assumed that the store in use is the one indicated when both tubes D1M and D2M in the decoder (Fig. 5) are struck.

COMPOSITION DISTRIBUTOR (See Figs. 13A and 13B)

The composition distributor is the unit which causes the characters which are to be recorded to be passed from the registers to the code transmitter. The composition distributor has one position for every possible tabulation signal, e. g. if the maximum required tabulation signals for the final teleprinter record are 7 spaces, carriage return and 3 line feeds, there must be 11 distributor positions to deal with these. Also there is provided one position for every possible character in a numerical result, e. g. with the maximum size of number assumed, that is 10 decimal positions, and with commas separating groups of three digits and up to 3 places to the right of an integer point, there must be 19 distributor positions to deal with the various possibilities. The total distributor positions required is therefore 11+19=30, as shown by the table below.

In the following table setting out the arrangement of the distributor positions the designations "Digit A, Digit B . . . Digit J" have been used for the maximum of ten possible decimal digits in a result to be printed. Not all results will have ten digit places but however many there are, and wherever the integer point is required to be positioned, the last significant digit is the "Digit J." Hence for a three decimal digit result, the "Digits" H, I and J positions in the composition distributor are brought into use, irrespective of where the integer point has to be placed. A ten digit numerical result will of course require to use the distributor positions reserved for all the "Digits A to J."

Consider now the numerical results indicated by the following:

EFG,HIJ
EF,GHI . J
E,FGH.IJ
EFG.HIJ

By designating the digits of a numerical result in the manner set out above it will be appreciated that a distributor position has to be reserved between each adjacent pair of digits of greater significance than "Digit H." Furthermore an insertion of an integer point is possible between any adjacent pair of digits of less significance than "Digit G." Between "Digit G" and "Digit H" either a comma or an integer point is a possibility. With these various possibilities in mind the following table will be more readily understood.

| Distributor Positions | Character | Distributor Positions | Character |
|---|---|---|---|
| 1 | Space. | 17 | Comma. |
| 2 | Space. | 18 | Digit F. |
| 3 | Space. | 19 | Comma. |
| 4 | Space. | 20 | Digit G. |
| 5 | Space. | 21 | Comma or Integer Point. |
| 6 | Space. | | |
| 7 | Space. | 22 | Digit H. |
| 8 | Digit A. | 23 | Integer Point. |
| 9 | Comma. | 24 | Digit I. |
| 10 | Digit B. | 25 | Integer Point. |
| 11 | Comma. | 26 | Digit J. |
| 12 | Digit C. | 27 | Carriage Return. |
| 13 | Comma. | 28 | Line Feed. |
| 14 | Digit D. | 29 | Line Feed. |
| 15 | Comma. | 30 | Line Feed. |
| 16 | Digit E. | | |

Distributor position 21 is used for either a comma or an integer point. This alternative in no way affects the distributor; the character to be printed is changed in accordance with a register determination of whether the number to be recorded has 0 or 3 places to the right of the integer point. If there are 1 or 2 places to the right of the integer point, it will be seen from the example given above that neither a comma nor an integer point is needed between digits G and H. If there are no decimal places then a comma is required, whilst if there are 3 decimal places, an integer point is required.

The intelligence given in the composition instruction and the signals representative thereof passed to the composition control are used to switch out of circuit unwanted parts of the distributor for a particular result. For instance, if the composition instruction has stipulated that the requirement is 1 space, a 6-position number having 2 places to the right of the integer point, carriage return and 1 line feed, the distributor will be switched so that only the following positions are in circuit, the other positions being switched out.

| Distributor position | 7 | 16 | 17 | 18 | 20 | 22 | 23 | 24 | 26 | 27 | 30 |
|---|---|---|---|---|---|---|---|---|---|---|---|
| Character | Space. | Digit E. | Comma. | Digit F. | Digit G. | Digit H. | Integer Point. | Digit I. | Digit J. | Carriage Return. | Line Feed. |

Figs. 13A and 13B, together forming Fig. 13, show that part of the composition distributor used for the purpose of causing transmission of spaces. It consists essentially of an interconnected chain of cold cathode gas-filled glow discharge tubes CD0 . . . CD7. The operation of these is controlled from the "number of spaces" busbars which are themselves fed from the composition control circuit. In the rest condition of the present circuit tube CD0 alone is fired. Tubes CD1–7 provide the composition distributor positions related to spaces and DCB1 is the first of two buffer tubes whose purpose will be explained later. For a result in which there is to be 1 space before the digits are printed, "number of spaces" busbar 1 is provided with a positive potential from the composition control, the other busbars being at earth potential. Initially CD0 is struck by the momentary application of a negative potential applied to the reset lead when the H. T. is switched on. The cathode potential of CD0 applies a positive bias to rectifiers W435—442.

Under control of the time scale (Fig. 14), described below, positive potentials are applied to both of the leads TSA—K2 and TSB—K1. The result is that both rectifiers W443 and 444 are blocked by a positive bias. The next 5 kc./sec. pulse which is applied to step the time scale also applies a positive pulse to block rectifier W445. In consequence, this rectifier gate circuit is opened and a positive pulse is applied to all of the rectifiers W446—459.

Since all bushbars except No. 1 are at earth potential no triggering positive potential is forwarded except that to tube CD7 via rectifier W462. Tube CD7 fires extinguishing CD0 and thereby removing the positive potential from rectifiers W435—442. The cathode potential of CD7 applies a positive bias to rectifier W463.

The composition distributor remains stationary on CD7 for a period in which the five code elements denoting the space character are passed to the code transmitter.

At the end of this time the time scale applies positive bias to lead TSV—K7 and, immediately subsequent to this, a similar bias is applied to lead TSA—K2 so that both rectifiers W464 and 465 are blocked. The next 5 kc./sec. pulse is applied to block rectifier W466 also so that now rectifiers W460 and 461 are biased positively. CDB1, the buffer tube, is caused to strike via rectifier W467. The distributor remains on CDB1, which thereby provides a second transitory rest position, until once again TSA—K2 and TSB—K1 become positive when the required tube in the next section of the distributor which is prepared for operation by the potential to lead SL from CDB1 cathode is struck in a manner analogous to that described for tube CD7. This means that the buffer tube is struck only during the stop period for the previous character so that it does not affect the recording.

Had there been a requirement for 2 spaces indicated by the composition instruction, tube CD6 and not CD7 would have been struck after CD0. This would have caused a positive bias to be applied to rectifier W468 so that on the next occasion that the time scale provided positive potentials on leads TSA—K2 and TSB—K1, i. e. after the space character related to CD6 had been transmitted, CD7 would have been struck via rectifier W469 and the operation would have proceeded as described. The circuit operates in similar manner for any other number of spaces, except for the case of 0 spaces, the arrangement for which will now be described.

The bus bar for 0 spaces is at a positive potential so that when the time scale provides biases on leads TSA—K2 and TSB—K7 in its first cycle of operation, CDB1 strikes immediately via rectifier W470. It remains struck until the time scale biases leads TSA—K2 and TSB—K1 when the next required character tube will strike, say a tube CD8 of another part of the composition distributor (not shown). Again the buffer tube is extinguished before transmission of the code elements of the next character.

When all characters have been transmitted, in all cases the composition distributor returns to its home position, CD0, and the time scale and distributors are stopped until it is necessary to transmit the next result. The composition distributor will then again be switched by the composition control, in accordance with the new requirements.

TIME SCALE (See Fig. 14)

The time scale is the unit used to provide the 8-unit telegraph code used for recording the characters designated by the composition distributor. The time scale also provides the control potentials for stepping the composition distributor and the timings for the code transmitter.

Because of considerations connected with the tape machines used for recording, it is proposed to carry out recordings at 1000 bands. This means that each unit-period will be 1 millisecond. In order to produce pulses with such an inter-pulse interval 5 kc./sec. pulses are applied to a divide-by-5 stage. This stage comprises tube TSA and it controls the unit-period-producing multi-cathode tube TSB. The tube TSA, a decade multi-gap tube is arranged to divide by 5, by connecting cathode 1 to cathode 6, cathode 2 to cathode 7, . . . and cathode 5 to cathode 0. By suitable inter-connections of three cathodes, tube TSB is arranged to provide a divide-by-8 stage to give the 8 unit-periods for the telegraph code.

When the H. T. is switched on a relay (not shown) momentarily applies a negative potential to the reset lead causing the stop tube, TSZ, to strike. As the anode potential of TSZ falls from the full H. T. level to the sustaining voltage of the tube a negative pulse obtained from the anode of tube TST at point R is applied to the R leads in the cathode circuits of tubes TSA and TSB. The glow in the multicathode tubes is thereby caused to be positioned at either cathode 1 or 6 of tube TSA and on cathode 7 of tube TSB. Since TSA is cathode-connected to operate as if it were a 5-gap tube, it is immaterial whether the glow is positioned at cathode 1 or 6. In the following description it will be assumed that the glow discharge starts on cathode 1.

In the rest condition both gate tubes TGA and TGB are unoperated and the gates are therefore closed. When recording of a result is to take place, the sequence control circuit applies a positive potential to lead SCD and rectifier W471 is given a positive bias. The next 5 kc./sec. pulse causes rectifier W472 to become positively biased also for the duration of the pulse so that a triggering pulse is forwarded over condenser C214 and the start tube, TST, strikes. The tube TSZ is extinguished by TST becoming conducting. The cathode potential of TST is applied directly to the trigger of gate tube, TGA, so that the next 5 kc./sec. negative pulses applied to the cathode of TGA fires the latter tube. The immediate fall in potential across the anode resistance of TGA provides a negative-going pulse which is fed, over condenser C215, to the transfer electrodes of tube TSA. The glow discharge in this tube steps to cathode 2.

TSA makes one step for each applied pulse and will continue to step until the stop tube is operated. When the discharge in TSA reaches cathode 5, TGB is fired by a triggering potential being forwarded via decoupling rectifier W473. The next 5 kc./sec. pulse causes TSA to step its discharge to cathode 6 and TSB from cathode 7 to 8. TGB remains fired via rectifier W474 and so when TSA steps from cathode 6 to 7, TSB will step from cathode 8 to 9. Again TGB remains fired, this time via rectifier W475. When TSA takes a further step to cathode 8, TSB steps to cathode 0. The gate provided by TGB is now closed but it is reopened when TSA discharge steps to cathode 0. TSB then steps from cathode 0 to 1 as TSA likewise steps from cathode 0 to 1 after which the gate tube TGB is again extinguished. It can be seen that the discharge in tube TSB travels along cathodes 8, 9 and 0 whilst TSA steps from cathode 5 to cathode 1. In effect, these three cathodes 8, 9 and 0 of tube TSB combined provide an operation equivalent to one of the remaining TSB cathodes. The 8 unit-periods are obtained from the TSB tube with each period equal to the time taken for TSA to step from cathode 1 to cathode 6 or from cathode 6 to 1.

TSA continues to step and TSB is allowed to make one step whenever TSA steps away from cathode 5 or 0 except in the particular case of TSB, cathodes 8 and 9 for which the stepping is as described above. The circuit arrangement is such that TSA operates as a divide-by-5 circuit and TSB as a divide-by-8 circuit; leads taken from cathodes 1 to 8 of tube TSB provide timing potentials for the eight unit periods. The time during which the glow discharge remains on cathode 1 of tube TSB provides the first unit-period of the telegraph code, i. e. the start element, cathodes 2–6 of TSB give the five code element unit-periods, and cathodes 7 and 8 of the same tube give TSB K-7 the first and second stop elements respectively.

After all characters have been recorded, the composition distributor returns to its home position, thereby providing a potential on lead CD0. (The composition distributor is arranged to make its first step from tube CD0 therein before the time scale circuit operation reaches the condition in which cathodes 3 and 1 of tubes TSA and TSB respectively are conducting in their first cycle of operation). Lead CD0 gives rectifier W476 a positive bias. At this time TSB has cathode 1 conducting so giving a positive bias to rectifier W478. TSA steps its discharge to cathode 3 and applies a positive bias to rectifier W477 so that when the next 5 kc./sec. pulse is applied to block rectifier W479, tube TSZ strikes, TST is thereby extinguished and this action removes the positive potential from the trigger of TGA. The striking of TSZ also causes a negative pulse to be applied to the R leads and the glow discharge in the multicathode tubes will be restored to cathode 1 in tube TSA and cathode 7 in tube TSB K–7, i. e. the rest positions.

It will be appreciated that other rest positions could be used for the time scale. The rest positions chosen are preferred because they give the maximum time interval before the composition distributor has to step to its first working position. This time interval is used to allow the composition distributor to step from the buffer tubes used therein. There are probably many more characters to record than those listed in the description of the composition distributor, entailing more buffer tubes to simplify the circuit. Since the buffer tubes are connected permanently in circuit it may be necessary to pass over a number of these before the first character to be recorded is reached.

MULTIPLE INSTRUCTION STORE (See Fig. 15)

The multiple instruction register shown in the diagram is the one assumed to be brought into operation when both of the decoder tubes D1M and D2M have been struck by the original instruction passed from the outlet feeder. It consists of a tube distribution chain incorporating tube MI1, MI2 . . . MI*n*.

The number of tubes in the arrangement is dependent upon the number of results (*n*) in the multiple reconversion sequence, there being one tube for each result. Connections are taken from the cathodes of MI1–MI*n* to the composition control according to the tabulation requirements for the particular sequence of numbers which is to be reconverted and recorded. Also connections are made to the arithmetic unit so that the correct reconversion process will be carried out for individual results.

Initially, when the H. T. is switched on, a negative potential is applied to the reset lead causing tube MI1 to strike and the other tubes to be extinguished because of the current taken through the common anode resistance lowering the anode potential. If this particular multiple instruction store is being used, the reconversion of the first number takes place according to the requirement for this result, the controlling potentials for the arithmetic unit being derived from MI1. At the end of the reconversion process the sequence control circuit is energized as previously described and a positive potential is applied to the transfer control lead, giving a positive bias to rectifier W614. Rectifiers W615 and 616 are biassed positively since this store is in use. The next positive 5 kc./sec. pulse, which also steps on the sequence control, gives a positive bias for the duration of the pulse to rectifier W617. Thus, rectifiers W618–622 are all biassed positively. Since at this stage MI1 is struck, rectifier W623 also has a positive bias so that at the 5 kc./sec. pulse time a triggering potential is applied to cause MI2 to strike, MI1 being extinguished. When the reconverter ready signal is given to the computer by the sequence control the next result will be passed to the reconverter and this will be reconverted according to potentials derived from MI2. The operation proceeds for the remaining results. When the last result has been reconverted, the number end pulse at the end of the reconversion in conjunction with the potential derived from MI*n* causes the inlet switch to change over so that the contents next extracted from the outlet feeder pass to the decoder, and the multiple instruction store which has been used is automatically taken out of circuit.

TRANSMITTER (See Figs. 16 and 17)

The transmitter is the unit used to supply potentials for a magnetic tape recording machine in accordance with the information it is desired to record. It is controlled by the registers, the time scale and the composition distributor to cause telegraph signals to be passed to a magnetic tape machine which produces a record of the contents of the registers. The registers themselves provide the characters which are to be recorded, the time scale produces the unit-periods for the code signals and other time intervals necessary and the composition distributor passes the characters forward in their correct sequence.

Since each character consists of a start element, five code elements and two stop elements and the number of characters required for recording one result may be considerable, the transmitter is designed as a cascade arrangement. This obviates the necessity of having too large a number of controlling sources for any one tube. For example, if there is a possibility of having 30 characters in a result, the number of variable code elements would be 5×30=150, involving 150 controlling sources for a flip-flop tube pair used for the transmitter. By suitably dividing these sources it is possible to arrange that there would be, say, 8 flip-flop tube pairs each controlled from approximately 20 sources, and these pairs could be examined consecutively to control a further stage. To further reduce the controlling networks, it is arranged that the elements are examined for a "space" condition only and an automatic return of the flip-flop pairs to the "mark" condition is used.

Fig. 16 shows the controlling rectifier network used for the flip-flop tube pair TR1M/TR1S associated with the first three characters as a result. There are other tube pairs, TR2M/TR2S, TR3M/TR3S . . . (not shown) and suitable networks for other groups of three characters. Since the start and stop elements are invariable and are used for all characters, these may be inserted at the final stage of the transmitter as will later be explained in connection with Fig. 17.

Initially, it is arranged that a momentary application of a negative potential is made to the reset lead causing tube TR1M to strike. Assume that the characters associated with composition distributor positions CD1 and CD3 are to be recorded but the character associated with position CD2 is not required and further assume CD1 is associated with a space character, SSMSS.

As previously mentioned the composition distributor steps from its home position, CD0, to CD1 when the time scale steps from cathode 2 to 3 of tube TSA with cathode 1 of tube TSB conducting in the first time scale cycle, that is, before it is necessary to transmit the code elements. Thus rectifiers W486 and 497 and other corresponding rectifiers connected to CD1 are given a positive bias but connections fed from other distributor positions are at earth potential. When the time scale steps to cathode 3 of tube TSA and cathode 2 of tube TSB, rectifiers W481 and 483 acquire a positive bias but connections to the remaining TSB cathode positions are at earth potential. The next 5 kc./sec. positive pulse applied to rectifier W480, in conjunction with the bias on W481, causes a positive pulse to be applied to rectifiers W482, 493, 504, 506 and 508. However, rectifier W383 is the only TSB connection with a positive bias, so that the pulse will be applied to rectifiers W484, 487 and 490 but not to rectifiers W495, 498 and 501 or to rectifiers of other such sub-networks. Furthermore, since W486 is the only rectifier in the first sub-network to be biased positively by the composition distributor, the only path over which the flip-flop pair TR1M/TR1S can be effected is that over rectifiers W480, 481, 483, 485 and 486. It has been assumed that the first code element of the character associated with CD1 is a space. Therefore, tube CRA1–S, over the connection from the associated register, transmits a positive potential giving rise to a positive bias to rectifier W485. Thus, a positive pulse is applied via decoupling rectifier W510 to the trigger of tube TR1S, striking this tube and thereby extinguishing tube TR1M. Had the first code element been a mark, lead CRA1–S would have been at earth potential and the operated condition of tube TR1M would not have been distributed.

The time scale continues to step until when it reaches a position in which cathode 5 of tube TSA is conducting rectifier W525 is given a positive bias and the next 5 kc./sec. pulse applied to rectifier W526 produces a triggering potential which restrikes tube TR1M if necessary extinguishing tube TR1S. At the same time TSB is stepped from cathode 2 to 3 and a positive bias is applied to rectifier W494; the other rectifiers connected to TSB cathodes, e. g. W509 being connected to earth. The next time rectifiers W480 and 481 become positively biased, a positive pulse is applied to W495, 498 and 501. Again since rectifier W497 is the only connection to the distributor in this sub-network to have a positive potential the flip-flop is now controlled via decoupling rectifier W513. The second element, marked over lead CRB1–S, has been assumed to be a space, and therefore, W496 has a positive bias. Tube TR1S therefore again strikes by means of a positive pulse applied from the rectifier gating circuit over the decoupling rectifier. Again the flip-flop tube pair is restored to its normal condition with tube TR1M struck when rectifiers W525 and 526 become positive. The third element is now examined at the time position given by potentials appearing simultaneously on leads TSA–K3 and TSB–K4 and the flip-flop controlled via decoupling rectifier W516. For the example being considered, the third element is a mark so that no positive potential is applied to lead CRC1–S. Hence no triggering potential is forwarded to the flip-flop pair and this remains with TR1M conducting.

The two remaining elements for the character associated with CD1 will be examined in similar manner and TR1M/TR1S controlled via rectifiers W519 and 522 respectively. The two elements in question have been assumed to be space and, in consequence, tube TR1S will be struck for each at a time given by a potential appearing on lead TSA—K3 and extinguished at a time given by a similar appearance on lead TSA—K5. It should be noted that, for a space element, the cathode of tube TR1S becomes positive for a period during which the time scale is on cathode 4 and 5 of tube TSA.

Before the code elements of the next character have to be transmitted, the composition distributor steps to the position associated with this character. It has been assumed that CD2 is not required for the particular result. The composition control will cause this position to be switched out of circuit and the distributor will step from CD1 to CD3, via a buffer tube if one is used in this part of the composition distributor. The flip-flop pair TR1M/TR1S is now controlled by means of the rectifier gating sub-networks associated with CD3. TR1S is once more struck for space elements and the flip-flop pair is restored to the TR1M conducting condition after two further steps of the time scale.

When the code elements associated with the distributor positions connected to the controlling network of the tube pair TR1M and TR2M have all been examined, the final condition is with TR1M conducting. Further characters associated with other flip-flop pairs TR2M/TR2S etc. will be examined in a similar manner. It can be seen that by this arrangement whilst one flip-flop is being set according to the elements being examined, the others are resting in the mark condition. This factor is used in controlling the second part of the transmitter, shown in Fig. 17.

Connections are taken from the cathodes of the space tubes, TR1S, TR2S, TR3S etc., to a rectifier network used to control the flip-flop tube pair, TM—TS. Also in this stage is the connection by means of which the space element indicating the start unit-period is inserted.

When TR1M, TR2M etc., are initially struck tubes TM and TXM also are fired by potentials applied to their cathodes over the respective reset leads. Before the first code element is examined by TR1M/TR1S both rectifiers W527 and 528 (Fig. 17) are biased positively whilst the time scale potential is on lead TSB—K1. A 5 kc./sec. positive pulse is applied via rectifier W538 to the trigger electrode of tube TS. At this time the connections from TR1S, TR2S etc., are at earth potential as the respective flip-flop pairs are all in the mark condition. Tube TS strikes, extinguishing TM, so giving a positive bias to rectifier W545; W545 is connected to earth. The same positive pulse steps the time scale to produce a potential on lead TSA—K5 so that rectifiers W547 and 549 are given a positive bias. The next 5 kc./sec. pulse which steps the time scale to cathode of tube TSA and cathode 2 of tube TSB gives also a positive bias to rectifiers W546 and 548 for the duration of the pulse and, because of the potential already applied to W544, TXS strikes, extinguishing TXM. The output potentials taken from the cathodes of tubes TXM and TXS are used to control the record made on the magnetic tape used for storing the result.

The tube pair TM/TS is restored to its normal condition with TM conducting by means of the biases applied to rectifiers W542 and 543 but tube TXS remains conducting. The next time that the time scale steps to provide a potential on lead TSA—K4, TSB cathode 2 is conducting so that the connection to TS via rectifier W538 loses control. However, the connection from TR1S becomes positive whenever the code elements of the first character represent spaces and it remains at the positive potential for the time the time scale is on has its TSA discharge on cathodes 4 and 5. Connections from TR2S, TR3S . . . , are still connected to earth. It was assumed that the first code element was a space so that when rectifiers W527 and 528 become blocked, W533 is also positively biased and tube TS is therefore struck by a triggering pulse applied via rectifier W539. The conditions (blocked or unblocked) of W544 and 545 are again examined before the tube pair TM/TS is restored and since rectifier W545 has a positive bias due to TS conducting, tube TXS remains struck. Had the first variable element been a mark, W544 and not W545 would have had a positive bias so that TXM would then have been struck, extinguishing TXS, and causing a mark indication to be recorded on the tape.

TM is again restruck when the time scale gives a potential on lead TSA—K1. In like manner the other code elements denoted by the presence or absence of positive potentials on the connection from TR1S are examined. It should be noted that TXM/TXS is not automatically restored as is the case with the other flip-flop pairs but changes over only when there is a change of polarity detected in the examined elements. After the code elements of the first character have been examined TM restores to its conducting state and this flip-flop pair remains in this state until the time scale returns to the condition in which potentials are produced on leads TSA—K4 and TSB—K1 enabling another start element to be inserted before the next character to be recorded. The time interval between the end of the fifth code element and the next start element is equal to two unit-periods and provides the two recorded mark elements used for the stop portion of the character combination.

The potentials on TR2S, TR3S . . ., are examined in similar manner and the signals denoting the code elements of the different characters are passed in correct sequence to the recording medium.

Although connections have been shown for all code elements in Fig. 16, it should be understood that in the case of an invariable character, e. g. line feed, associated with a particular distributor position only the space elements need be connected in the network. The mark elements of such character would be inserted by the flip-flop tube pair remaining in the condition for recording a mark.

OUTPUT READER (See Fig. 18)

The output reader is the unit used to examine the output immediately preceding its recording on the tape machine so that a digit other than zero can be detected. As has previously been explained detection controls such changes in the registers as may be required.

Since it is possible that there may be characters other than space characters which have to be recorded before the numerical portion of a result is reached the output reader must be prevented from operating until the numerical portion is being transmitted. The buffer tube preceding the composition distributor positions associated with the numerical part of the result is therefore used for energising the output reader. The buffer tube in the composition distributor following the numerical position is used to cut off the output reader.

A space character is given by SSMSS. To simplify the output reader it is preferred to look for the opposite element in any of these positions, i. e. a character is examined for mark in the first code element position, mark in the second, space in the third, mark in the fourth and mark in the fifth. The correct times for examining the elements are given by the time scale.

The output reader consists essentially of a complex rectifier gating circuit (shown at the top of Fig. 18) and two flip-flop tube pairs comprising tubes ORN, ORO; SOR, UOR. The rectifier gating circuit controls the tube operation in conjunction with potentials provided from the buffer tube cathodes as suggested above. The leads from the buffer tubes are referred to as "Buffer 1" and "Buffer 2" respectively.

When the H. T. is switched on a negative potential is applied momentarily by means of a relay to the reset leads so causing tubes UOR and ORN to strike. The cathode of ORO is connected to the registers and since, at this time, ORO is extinguished, there will be an earth potential applied to this connection. Also since tube SOR is extinguished rectifiers W550 and 551 are connected to earth over rectifier W552. Hence the rectifier gating circuit is wholly grounded and no application of 5 kc./sec. positive pulses can strike ORO even though all other rectifiers have a positive bias. The circuit remains in this condition whilst all characters required to appear before the numerical portion of the result are being transmitted. During the stop element of the last of these transmitted character combinations, the composition distributor steps to the buffer tube preceding the numerical position and the lead "Buffer 1" acquires a positive potential. Rectifier W553 is then given a positive bias. Whilst this bias is present a 5 kc./sec. pulse applied to rectifier W554 causes tube SOR to strike, thereby extinguishing UOR. A positive bias is now applied from the cathode of SOR to rectifier W552 so that no longer are rectifiers W550 and 551 provided with a path to ground. The output reader is now ready to examine future transmitted signals.

At a time given by the arrival of positive potentials on leads TSA—K5 and TSB—K2 the state of the cathode of tube TM in the transmitter (Fig. 17) is examined via lead TM (Fig. 16). The potential on TM is the complement of that of lead TS from tube TS in the transmitter, i. e. when TM is positive, TS is at earth and vice versa. If a mark is being transmitted, TM lead is at a positive potential and rectifier W555 has a positive bias. Hence when a 5 kc./sec. pulse is applied to block rectifier W556 the combination rectifiers W550, 555, 556 and 557 all being blocked together causes rectifiers W558—561 to be positively biased. As rectifier W562 is blocked over lead TSB—K2 tube ORO is made to strike by a triggering potential applied via decoupling rectifier W563. However, if a space is being transmitted, lead TM will be at earth potential and so no triggering potential can be forwarded over W563. The other possible controlling network comprising rectifiers W551 and 564—8 is at this time rendered inoperative by reason of an earth potential found on the TSB—K4 lead.

If ORO is struck it is known that the first code element of the character being transmitted is not a space. Hence the potential from the cathode of ORO can effect the necessary change in the registers which are registering a space instead of a zero character. At a time given by potentials appearing on leads TSA—K5 and TSB—K3 the second code element is examined for a mark. If a mark is present, TM lead is at a positive potential and should ORO not have struck during the examination of the first element it would be struck via rectifier W569. As it is tube ORO remains fired. Similarly the third element is examined, this time for a space given by marking the TS lead at a time given by potentials appearing on leads TSA—K5 and TSB—K4; the fourth and fifth elements are examined for a mark condition at times given by indications over leads TSA—K5, TSB—K5 and TSA—K5, TSB—K6 respectively. Tube ORO is struck by any condition which detects that the code element then being reviewed is a code element of a character other than a space character.

After the numerical part of the result has been recorded the composition distributor steps to the next buffer tube, so that lead "Buffer 2" is brought up to the potential of the conducting cathode of the associated tube. Rectifiers W570 and 571 are given a positive bias so that when a 5 kc./sec. positive pulse is applied to rectifiers W572 and 573, tubes UOR and ORN are struck. The output reader is thereby returned to its rest condition and is ready to be used in connection with the next result.

TAPE MACHINE DISTRIBUTOR (See Figs. 19 to 24)

The tape machine distributor consists of two main circuits. The first is a gas-filled discharge tube circuit (Fig. 19) which operates under the direction of various units of the reconverter and compositor and the second is the relay circuit (Fig. 20) which is controlled by the tube circuit. The latter circuit comprises three flip-flop tube pairs ATE/ATF, COR/COC, ATC/TMC. In the anode circuit of tube ATC is a relay PZ which exercises a starting function over the relay circuit. The latter has four distinct contact circuits and these are numbered Figs. 21 to 24. Fig. 21 shows the A. C. supply arrangement for the motors of the three magnetic tape storage machines to each of which the information to be recorded is passed in turn. Fig. 22 provides the contact arrangement for passing information from the transmitter to whichever one of the tape machines is in use at a particular time. Fig. 23 shows a circuit for starting up the mechanical timing mechanisms associated with each of the tape machines. Fig. 24 gives the lamp indication scheme for showing the state of readiness of the three tape machines.

The magnetic tape storage units themselves as far as the driving mechanism and general construction are concerned are each similar to that described in South African Patent No. 7,752. The machine makes use of an endless loop of magnetic tape which is driven independently past recording and reproducing heads. The two bights of slack tape between the two heads are both contained within a single storage compartment having no internal divisions. This compartment is made removable from the recording and reproducing equipment proper in a known manner. Each tape storage container is loaded ready on to a recording machine and this action closes the earth contacts, such as "Tape M/C No. 1," connected to the left hand windings of relays AZ, BZ and CZ (Fig. 20).

When the H. T. is switched on, a relay applies negative potential momentarily to the reset leads causing tubes ATF, COC and TMC (Fig. 19) to strike. No relays of the Fig. 20 circuit or relay PZ of Fig. 19 circuit are operated at this time.

When the recording of information is to take place, the start key is thrown. Relay AZ operates via *pz*1 back, *cz*2, *bz*2 and *bna*2 all back, relay A to earth. The operation of the start key also causes the green lamps to light (see Fig. 24) but relay AZ operating changes over contact *az*7 and the amber light of machine 1 is lit indicating that this machine is to take the first part of the recording. Contact *az*1 front prepares a locking circuit for AZ and for operate circuits for relays BUA and BZ. Contacts *az*2 and *az*3 front apply 50 cycles/sec. mains to the motor of machine 1, *az*4 and *az*5 front connect the transmitter to the recording head of machine 1 and *az*6 front starts the timing device associated with this machine. Recording now takes place on this machine. When the tape is nearly full, contacts on the timing mechanism apply a positive potential to rectifier W574; it is not desired to stop the machine at this time and change to the next machine for a changeover of machine takes place only when the complete contents of an output annex tube have been received and recorded. When the last result in an annex tube has been passed to the reconverter, the annex changeover pulse causes rectifier W575 to be biased positively and this, in conjunction with the bias from the tape timer causes tube ATE to strike thereby extinguishing ATF. A positive bias is applied from the cathode of ATE to block rectifier W576. When the last result is to be passed from the reconverter to the compositor the transfer control lead from the sequence control circuit becomes positive and the next 5 kc./sec. pulse from the local generator effects the transfer. This causes a positive bias to be applied to rectifiers W577 and W578 which, together with the bias already on rectifier W576, results in tube COR striking, thereby extinguishing tube COC. At the same time rectifiers W579 and 580 are also biased positively so that ATF restrikes extinguishing ATE. Rectifier W581 now has a positive bias from the cathode of COR. When the last result from the annex tube has been recorded when the time scale reaches positions at which it applies positive potentials to leads TSA—K3 and TSB—K1 and when the composition distributor has tube CD0 fired, rectifiers W582–3 and –4 are all biased positively so striking ATC and extinguishing TMC. The tape machine changeover can now take place; the removal of the bias from the lead to the sequence control lead prevents further information from being passed to the compositor until the changeover is complete.

The striking of ATC causes relay PZ to operate. Contact *pz*5 front applies a positive potential to COC, striking this tube and extinguishing COR. *pz*2 and *pz*3 front contacts break the motor circuit of machine 1 (see Fig. 21) and *pz*4, Fig. 23, front stops the tape timer of this machine which is automatically reset. Contact *pz*1 front completes the locking circuit of relay AZ via *az*1 front and also operates relays BUA and BZ. *bua*7 front locks relay BUA to the tape machine No. 2 earth, *bua*2 front breaks the operating circuit of relay AZ and *bua*3 front prepares, the circuit to light the red lamp of machine 1 to indicate "tape container full." Contact *bz*1 front prepares the locking circuit of relay BZ and the operating circuit of relays BUB and CZ. Front contact *bz*2 completes the locking circuit of relay BZ for when contact *pz*1 restores, *bz*3 and *bz*4 prepare machine 2 motor circuit. Front contacts *bz*5 and *bz*6 connect the transmitter to machine 2, *bz*7 front prepares the timing device of machine 2, *bz*8 front lights machine 2 amber lamp showing machine 2 in use and *bz*9 applies a positive pulse to the trigger of TMC. This tube strikes and extinguishes ATC, which action causes relay PZ to release. Contact *pz*1 releasing causes AZ to release and also starts the motor of the second machine. The application of a positive potential from TMC cathode to the sequence control lead allows further information to pass to the compositor, and further recording takes place on machine 2.

When AZ is released the red lamp of machine 1 is lit via *az*7 back and *bua*3 front to indicate that this tape container can be changed. The removal of the container breaks the earth connection so that BUA releases and the green lamp of machine 1 is lit. The new box is loaded so preparing the operating circuits of relays AZ and BUA.

Again when machine 2 is nearly full an indication is given by machine 2 tape timer so that when the last result in the current output annex tube has been recorded ATC is again struck and PZ operated. The sequence of striking of the gas tubes is then followed through again as described for machine 1. In the relay circuit BUB and CZ operate via *pz*1 front, *az*1 front and *bz*1 front. Contacts *pz*2 and *pz*3 front break the motor circuits and *pz*4 front breaks the timing circuit. Contact *bub*1 front locks relay BUB to the tape machine earth, and *bub*3 front prepares the circuit of the red lamp associated with machine 2. Relay CZ operated causes a pulse to be applied to the trigger of TMC over *cz*9 front striking this tube and releasing relay PZ. On contact *pz*1 restoring relay BZ is released but CZ is held via *pz*1 back and *cz*2 front. Back contacts *pz*2 and *pz*3 connect the mains supply to the motor of machine 3 and *pz*4 back starts machine 3 timing circuit and and recording now takes place on machine 3, via *cz*5 and *cz*6 front contacts. BZ releasing causes machine 2 red lamp to light via *bz*8 front and *bub*3 back indicating that the container on this machine can be changed.

The next time PZ is operated, BUC operates via *pz*1 front, *az*1 back, *bz*1 back and *cz*1 front. Contact *buc*1 front locks relay BUC, *buc*4 front breaks the holding circuit of CZ allowing CZ to release and *buc*3 front prepares the red lamp circuit of machine 3. Also *pz*1 front causes CZ to release, so that the red lamp lights via *cz*8 back and *buc*3 front. On contact *cz*9 releasing a pulse is applied to TMC causing this tube to strike and release PZ. Contact *pz*1 back causes AZ to operate via *cz*2 back, *bz*2 back and *bua*2 back and the cycle of operation proceeds.

If a full tape container has been removed and no replacement loaded on a machine, the relay associated with this machine, e. g. AZ relay for machine 1, cannot operate since the tape machine earth connection is broken and so recording stops at this machine until a new container is loaded. If necessary alarms could be included to indicate this condition.

In the claims which follow, the composition instructions which are received by the apparatus are referred to as signals, while the sets of composition instructions which are permanently stored are referred to as instructions. Thus, a multiple composition instruction is designated a signal, and the set of composition instructions which it causes to be selected for use is referred to as an instruction. Individual composition instructions, each of which relates to one information number, are also referred to as signals.

While the principles of the invention have been described above in connection with specific embodiments, and particular modifications thereof, it is to be clearly understood that this description is made only by way of example and not as a limitation on the scope of the invention.

What we claim is:

1. In electrical recording apparatus, a recording device for recording information on a recording medium, a storage device in which a number of predetermined instructions are permanently stored, each said instruction relating to the manner in which information is to be recorded, input equipment over which information to be recorded and signals relating to said information are received, each said signal identifying one of said instructions, a discriminating device to which said signals are applied from said input equipment, said discriminating device determining which one of a number of instruction-identifying signals has been received, means responsive to determination by said discriminating device of the identity of a received signal to select that one of said instructions which is identified by said signal, and means responsive to said selection to cause said recording device to record the information to which said signal relates in a manner indicated by said selected instruction.

2. Apparatus as claimed in claim 1, in which said signals are received as binary-coded pulse trains, and in which said input equipment comprises a number of bistable flip-flop pairs, means for applying different digits of a received signal item to respective ones of said flip-flop pairs, and means for causing each said flip-flop pair to assume its operated condition if the digit applied thereto is a binary 1 and to cause said flip-flop pair to remain in its unoperated condition if the digit applied thereto is a binary 0.

3. Apparatus as claimed in claim 2, and in which said discriminating means comprises a coincidence gate circuit individual to each said instruction, a plurality of control leads for each said coincidence gate circuit, which control leads are so connected to the flip-flop pairs of said input equipment that a coincidence gate circuit has all of its control leads simultaneously energized only when the signal to which that gate circuit applies has been received, means in each said gate circuit responsive to all the control leads of that gate circuit being simultaneously energized to deliver an output, and means for applying said output to said selecting means, which latter thereupon selects the appropriate one of said instructions.

4. Apparatus as claimed in claim 3, in which the information to be recorded under control of one of said instructions is a series of separate information items, and in which said storage device comprises a plurality of sets of discharge tubes, one set per instruction, each said set being interconnected as a counting chain of the type in which only one tube is normally operated, means associated with each said set of tubes responsive to the operation of one of the tubes of that set to render inoperative any hitherto operated tube of that set, means responsive to selection of one of said instructions by said selection means to operate the first tube of the set of tubes for that instruction, means responsive to the first tube of the selected set assuming its operated condition to cause said recording device to record the first received information item in a particular manner, means responsive to the completion of said recording to operate the second tube of the selected set of tubes, means responsive to the second tube of the selected set assuming its operated condition to cause said recording device to record the second received information item in a particular manner, means responsive to the completion of said recording to operate the third tube of said selected set of tubes, and means responsive to the third tube of the selected set assuming its operated condition to cause alternately the recording of other received information and the operation of another tube of said selected set of tubes in a similar manner until all tubes of said selected set have been operated, whereupon all information items to which said instruction item applies will have been dealt with.

5. In electrical recording apparatus, a recording device for recording information on a recording medium, a storage device in which a number (including one) of instructions are permanently stored, each said instruction relating to the manner in which information is to be recorded, input equipment over which information to be recorded and signals relating to said information are received, there being two kinds of signals of which the first kind relates to the manner in which associated information is to be recorded and the second kind identifies one of said stored instructions, a discriminating device to which said signals are applied from said input equipment, said discriminating device being arranged to identify a received signal, means responsive to determination by said discriminating means that a received signal is one of said first kind to cause said recording device to record the information with which that signal is associated, in a manner indicated by that signal, means responsive to determination by said discriminating device that a received signal is one of said second kind to select that instruction which is identified by the received signal, and means responsive to said selection to cause said recording device to record the information to which said signal of the second kind relates, in a manner indicated by the selected instruction.

References Cited in the file of this patent

UNITED STATES PATENTS

| | | |
|---|---|---|
| 2,402,989 | Dickinson | July 2, 1946 |
| 2,407,320 | Miller | Sept. 10, 1946 |
| 2,556,614 | Desch et al. | June 12, 1951 |
| 2,587,532 | Schmidt | Feb. 26, 1952 |